(12) United States Patent
Grace et al.

(10) Patent No.: US 6,581,968 B1
(45) Date of Patent: Jun. 24, 2003

(54) SAFETY BELT TENSION TRANSFER SYSTEM

(75) Inventors: Gregory Brian Grace, Mesa, AZ (US); Todd Richard Hurley, Fountain Hills, AZ (US)

(73) Assignee: Simula, Inc., Phoenix, AZ (US)

( * ) Notice: Subject to any disclaimer, the term of this patent is extended or adjusted under 35 U.S.C. 154(b) by 0 days.

(21) Appl. No.: 09/970,778

(22) Filed: Oct. 5, 2001

(51) Int. Cl.[7] .............................................. B60R 22/28
(52) U.S. Cl. ..................... 280/801.1; 280/805; 280/808
(58) Field of Search ............................ 280/801.1, 805, 280/808; 297/468, 470, 471, 483; 244/122 R, 122 B

(56) References Cited

U.S. PATENT DOCUMENTS 3,582,136 A  * 6/1971 Pringle
5,658,012 A  * 8/1997 Villarreal et al. ........... 280/805
5,839,753 A    11/1998 Yaniv et al. ................. 280/733

FOREIGN PATENT DOCUMENTS

SU  4918721  * 5/1993

* cited by examiner

*Primary Examiner*—Eric Culbreth
(74) *Attorney, Agent, or Firm*—Shaw Pittman LLP

(57) ABSTRACT

A vehicle safety restraint system for a vehicle that allows transfer of tensile force from a transferor belt to a transferee belt. One end of the transferor belt is secured to the vehicle and the other end is attached to a transferor plate. One end of the transferee belt is secured to the vehicle and the other end is fed through a transferee plate and attached to a tension transfer latch plate. During normal use conditions, the transferee plate and the tension transfer latch plate are united, the transferor plate and the tension transfer latch plate are engaged using a quick release mechanism, and the transferee plate is engaged in a buckle that is secured to the vehicle. When the vehicle experiences a sudden deceleration that exerts a tensile force on the transferor belt, the tension transfer latch plate is separated from the transferee plate if the tensile force exceeds a design value. When the tension transfer latch plate is separated, the tensile force is transferred to the transferee belt.

27 Claims, 27 Drawing Sheets

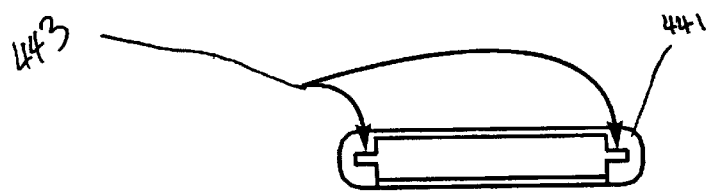
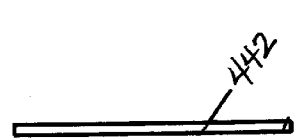
FIG. 4bb  FIG. 4aa
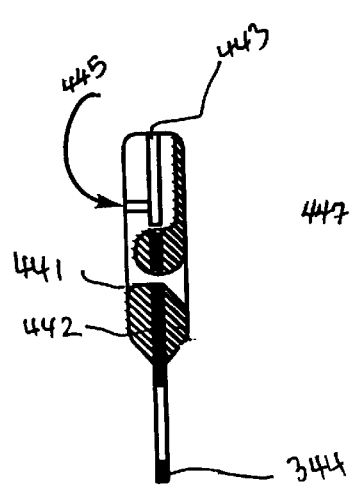
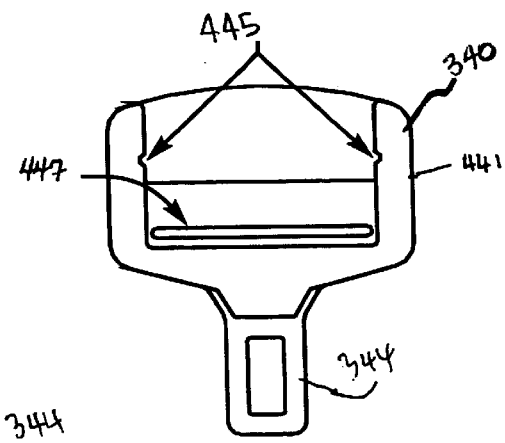
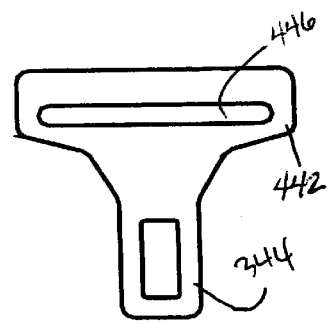
FIG. 4c  FIG. 4b  FIG. 4a
FIG. 4

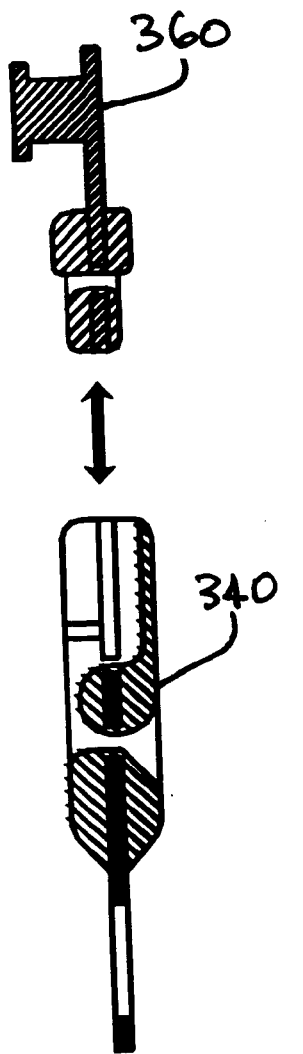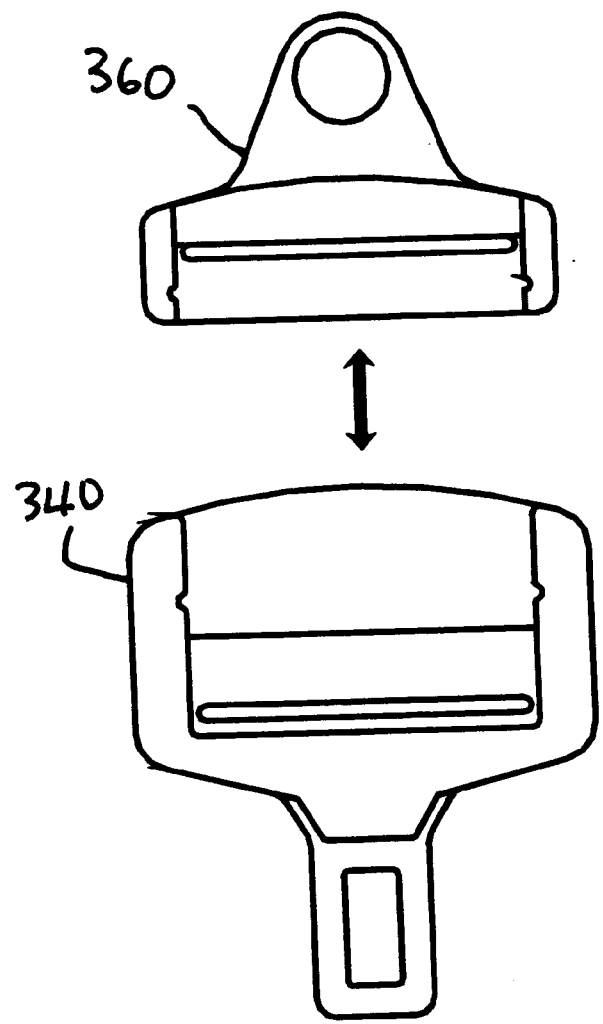
FIG. 6b  FIG. 6a
FIG. 6

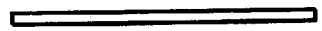
FIG. 10bb
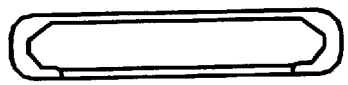
FIG. 10aa
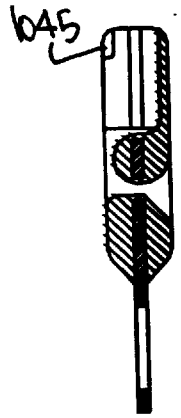
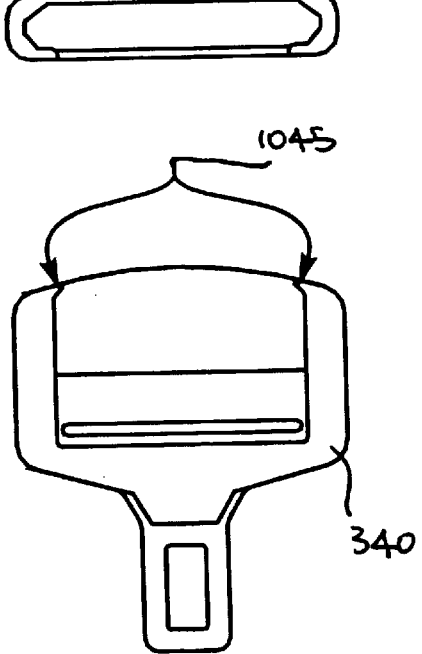
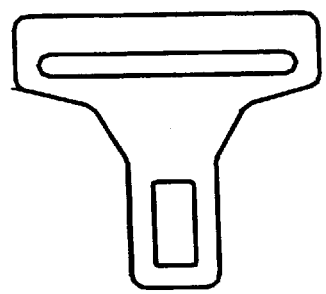
FIG. 10c    FIG. 10b    FIG. 10a
FIG. 10

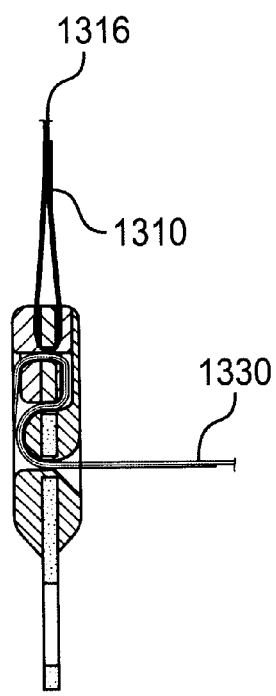 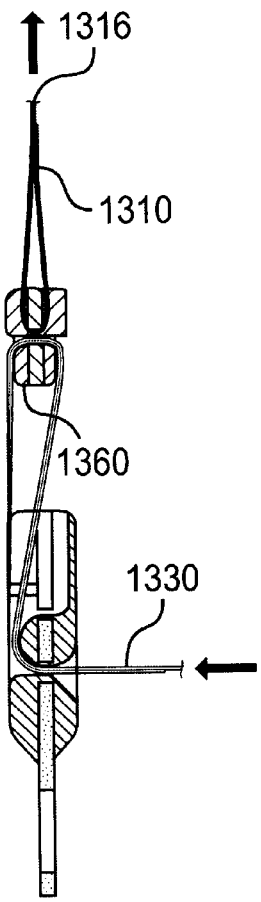
FIG. 13a  FIG. 13b

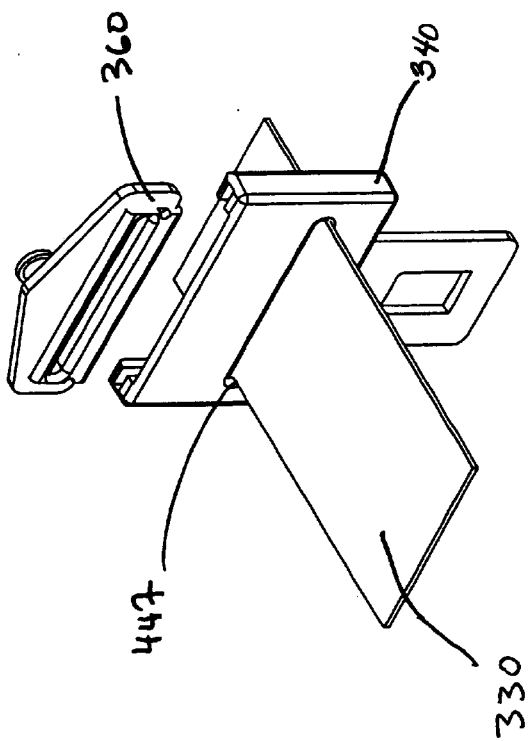
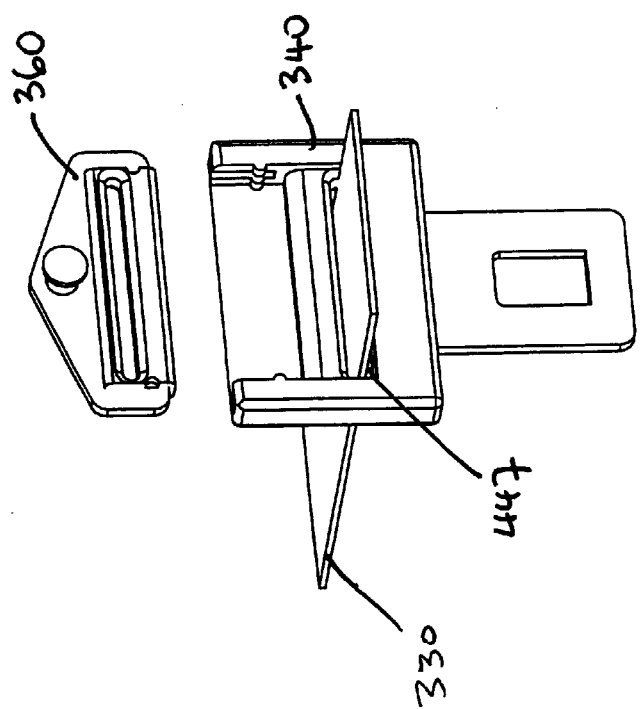
FIG. 15a
FIG. 15b
FIG. 15

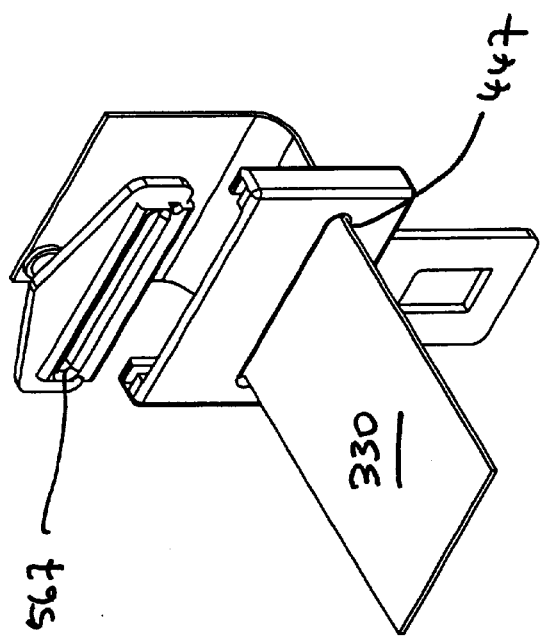
FIG. 16b
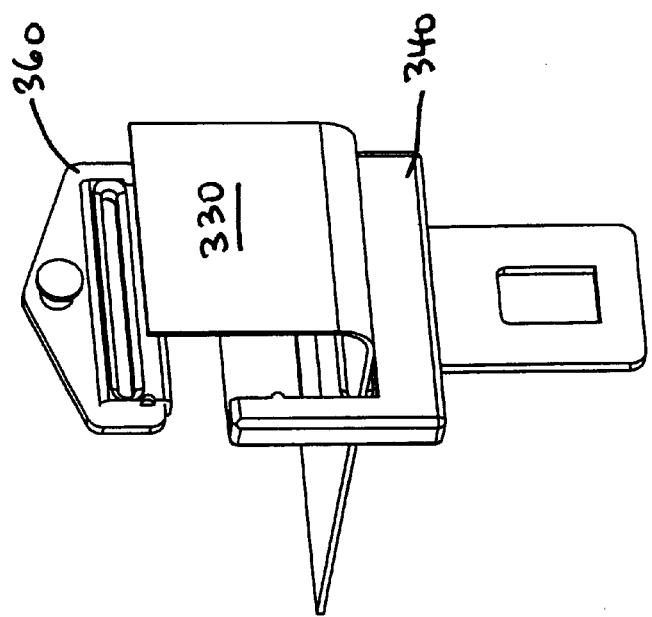
FIG. 16a
FIG. 16

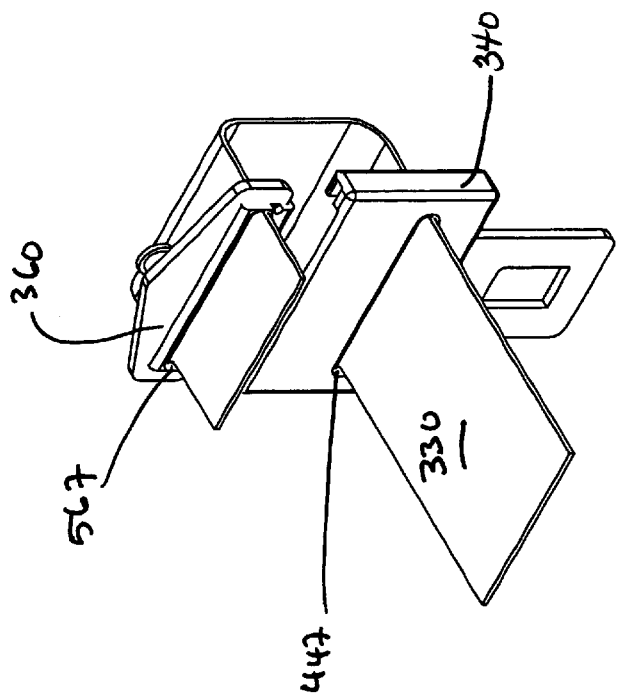
FIG. 17b
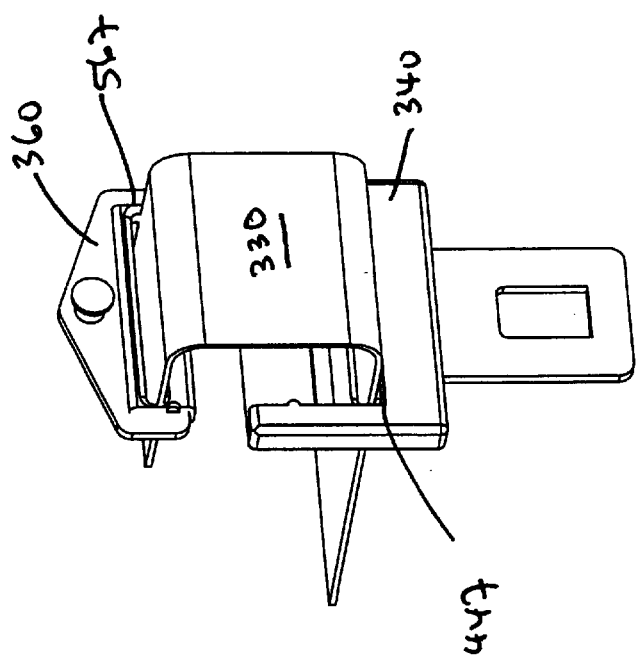
FIG. 17a
FIG. 17

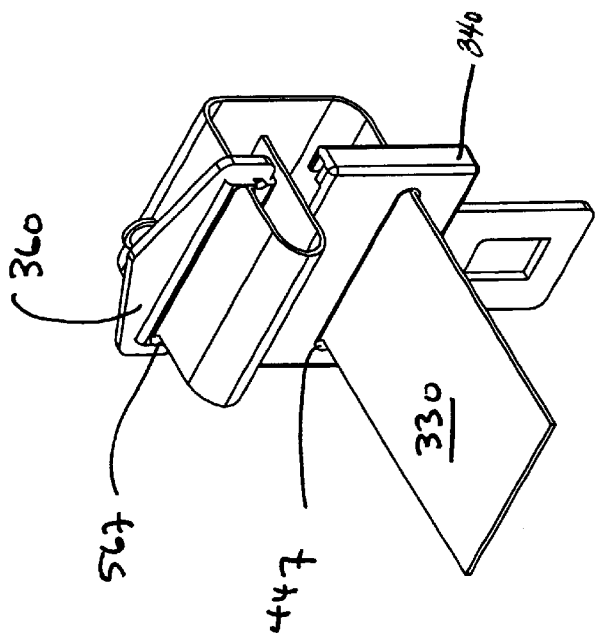
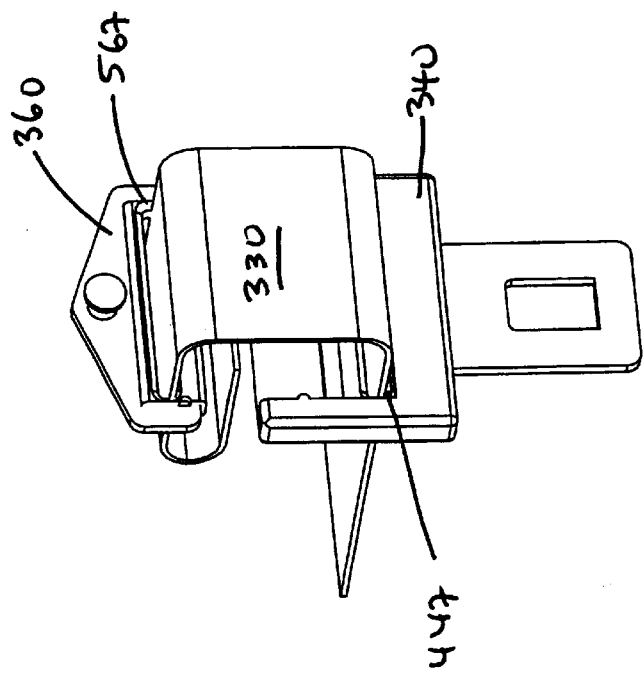
FIG. 18a     FIG. 18b
FIG. 18

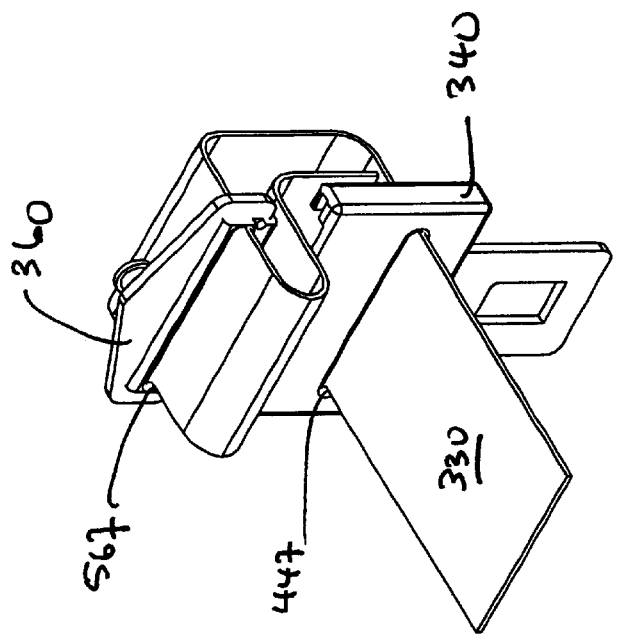
FIG. 19b
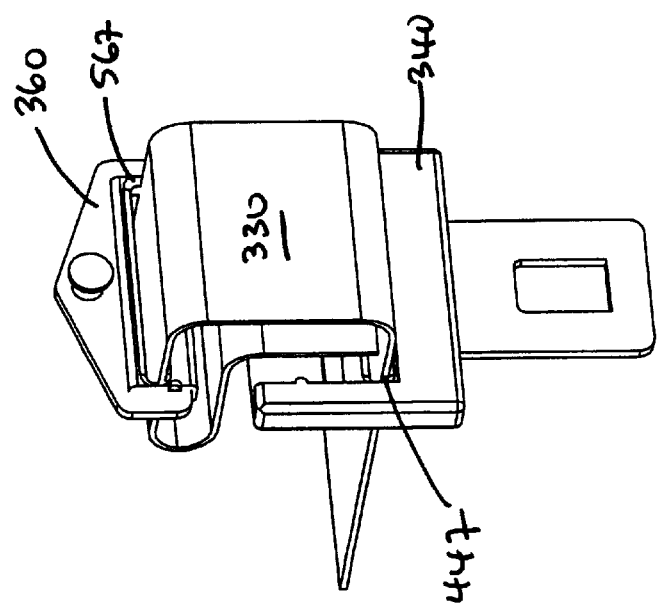
FIG. 19a
FIG. 19

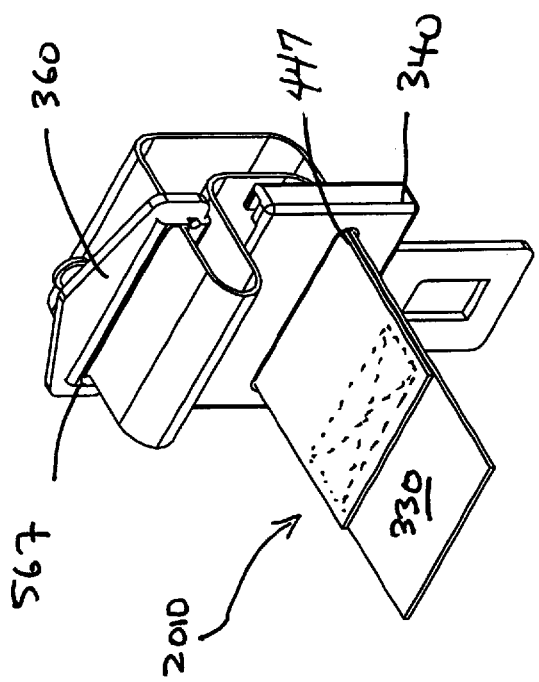
FIG. 20b
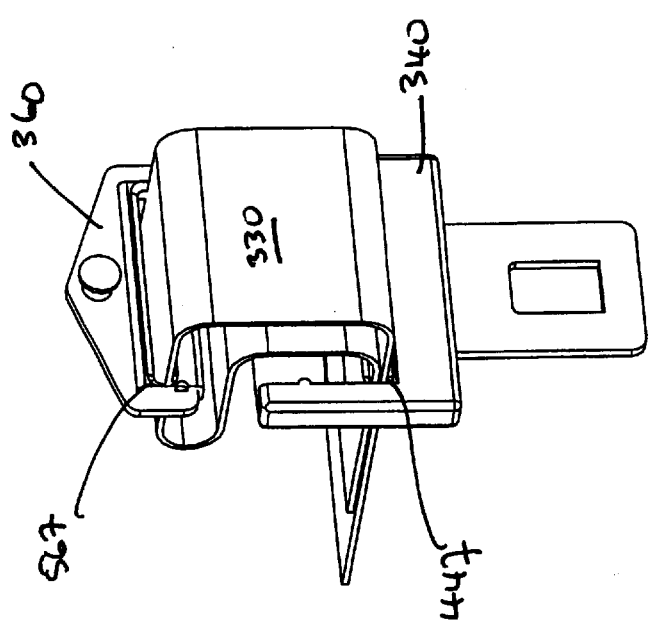
FIG. 20a
FIG. 20

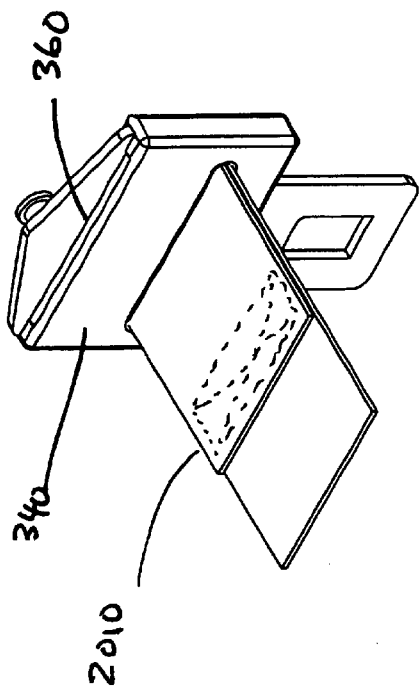
FIG. 21b
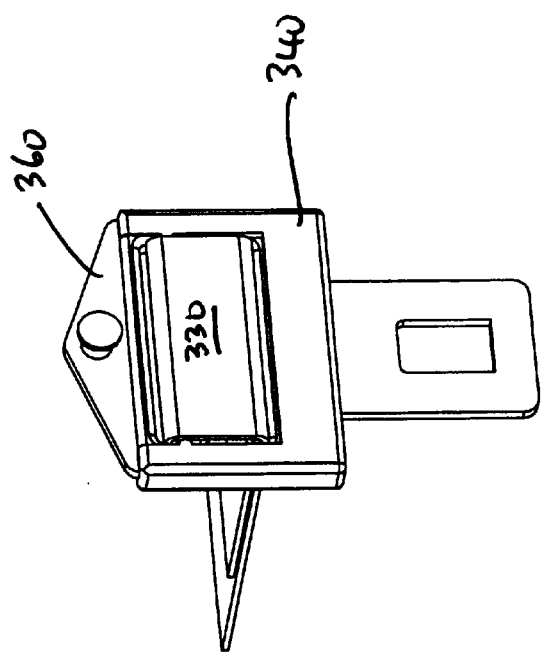
FIG. 21a
FIG. 21

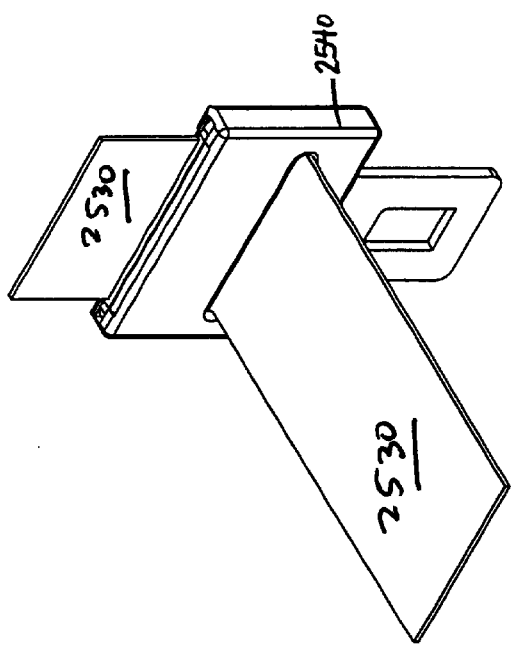
FIG. 25b
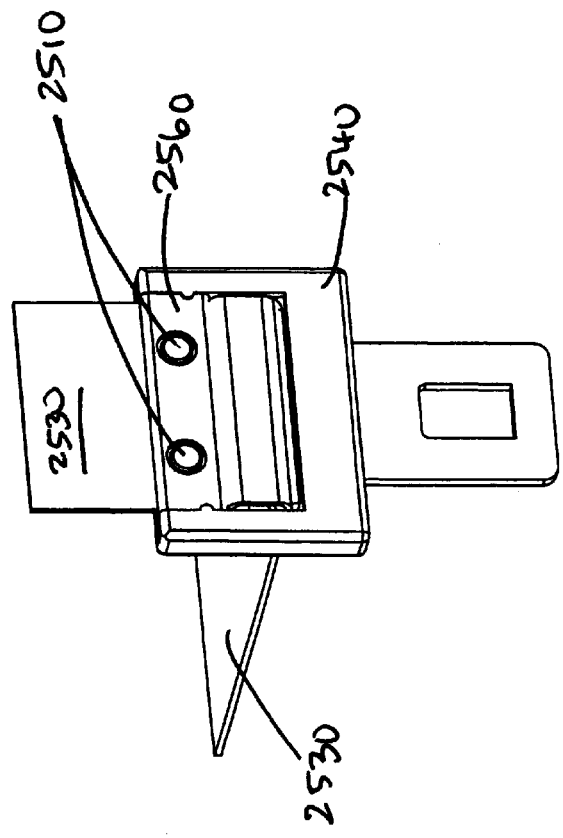
FIG. 25a
FIG. 25

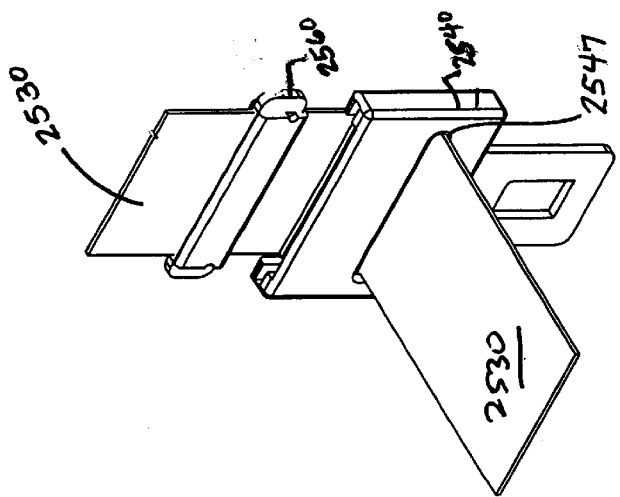
FIG. 26b
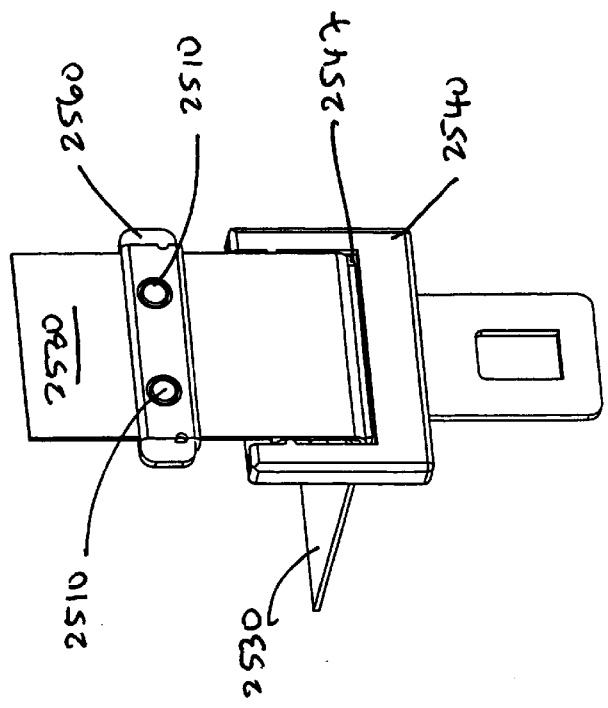
FIG. 26a
FIG. 26

SAFETY BELT TENSION TRANSFER SYSTEM

BACKGROUND

1. Field of the Invention

The present invention relates to vehicular safety devices, and more particularly, to a seat belt system comprising a lap belt that can be used independently of an associated shoulder belt.

2. Background of the Invention

FIG. 1 shows a prior art seat belt system that is designed to protect a person, passenger or a driver, who is seated on seat 10 of a vehicle. The system comprises webbing 102, sliding latch plate 140 and buckle 150. First end 112 of webbing 102 is secured to the vehicle at an area at about the level of the person's shoulder. Second end 114 of webbing 102 is secured to the vehicle at an area at about the level of the person's hip. A seat belt pretensioner (not shown) can be installed at either first end 112 or second end 114 to provide tension on webbing 102. Inertia reels can also be placed at any vehicle mount to provide tension. In addition, pretensioners (including buckle pretensioners which can provide tensioning in both the lap and shoulder webbing) can be equipped with the seat belt system.

As shown in FIG. 1, first end 112 and second end 114 are secured to the vehicle on one side of the person while buckle 150 is secured to the vehicle on the opposite side. Sliding latch plate 140 comprises slot 142 and tongue 144. Webbing 102 is fed through slot 142 such that sliding latch plate 140 can slide along the full length of webbing 102. Buckle 150 is secured to the vehicle at an area at about the level of the person's hip, but on the opposite side of second end 114. When in use, tongue 144 of sliding latch plate 140 is engaged in buckle 150, thus allowing shoulder belt portion 110 of webbing 102 to rest over one shoulder of the person and across his or her body, and lap belt portion 130 of webbing 102 to rest over the lap of the person. When the vehicle experiences a sudden deceleration, the body of the person leans forward and causes a tensile force to exert on shoulder belt portion 110. Since slot 142 is free to slide along webbing 102, the tensile force is transferred to lap belt portion 130 as well.

While this seat belt system is common to ground vehicles such as automobiles, it is less desirable for airborne vehicles such as airplanes. In the aviation industry, particularly for airplanes having side facing seats, it is preferable to have a safety belt system comprises a lap belt that can be worn independently of an associated shoulder belt. Such a system allows a passenger to be secured by the lap belt, without being restricted by the shoulder belt during normal level flight.

FIG. 2 shows another prior art system that is used in the aviation industry today. System 200 comprises shoulder belt webbing 210, shoulder belt latch plate 220, lap belt webbing 230, lap belt latch plate 240, and buckle 250. Manual lap belt and shoulder belt adjusters are often used.

First end 212 of shoulder belt webbing 210 is secured to the vehicle. A shoulder belt pretensioner (not shown) can be provided to exert tension on shoulder belt webbing 210. Second end 214 of shoulder belt webbing 210 is attached to shoulder belt latch plate 220. Shoulder belt latch plate 220 comprises snap slot 222. The safety belt system can be equipped with supplemental safety device 216. An example of supplemental safety device 216 is the Inflatable Tubular Torso Restraint (ITTR) manufactured by Simula Technology, Inc. of Phoenix, Ariz. The ITTR is fully disclosed in U.S. Pat. No. 5,839,753 (issued to Yaniv et al.), which is hereby incorporated by reference in its entirety.

First end 232 of lap belt webbing 230 is attached to lap belt latch plate 240, while second end 234 of lap belt webbing 230 is secured to the vehicle, on the same side of seat 20 where shoulder belt webbing 210 is secured. Lap belt latch plate 240 comprises snap stud 242, slot 246, and tongue 244. Snap stud 242 is adapted to receive snap slot 222. Tongue 244 is adapted to fit into buckle 250. Buckle 250 is secured to the vehicle.

A tensile force can be exerted on shoulder belt webbing 210 in one of several ways. For example, if seat 20 is in a forward-facing orientation, when the vehicle experiences a sudden deceleration, the body of the passenger leans forward and causes a tensile force to be exerted on shoulder belt webbing 210. In addition, the tensile force can be exerted when supplemental safety device 216 is deployed. Unlike in the system of FIG. 1, however, the tensile force exerted on shoulder belt webbing 210 in this system is not transferred to lap belt webbing 230. There is no transfer of tensile force in this system because shoulder belt webbing 210 and lap belt webbing 230 are independent of each other. In other words, since lap belt webbing 230 is permanently attached to lap belt latch plate 240, and lap belt latch plate 240 is attached to buckle 250 that is secured to the vehicle, the tension in shoulder belt webbing 210 cannot be transferred to lap belt webbing 230. This allows the passenger's lower torso to move, thereby increasing the possibility of occupant injury during crashes. As a result, lap belt webbing 230 does not receive any benefit from supplemental safety device 216 or the shoulder belt pretensioner.

SUMMARY OF THE INVENTION

The present invention is a seat belt system that allows transfer of tension from a transferor belt, e.g., the shoulder belt, to a transferee belt, e.g., the lap belt. A preferred embodiment of the present invention can be used with a supplemental safety device such as the ITTR referenced above.

A preferred embodiment of the present invention comprises a shoulder belt webbing (the transferor belt), a shoulder belt latch plate (the transferor plate), a lap belt webbing (the transferee belt), a lap belt latch plate (the transferee plate), a buckle, and a tension transfer latch plate. During normal use, the lap belt latch plate and the tension transfer latch plate act as one unitary component. When the shoulder belt webbing is pulled and/or the supplemental safety device is deployed by a tensile force that is greater than or equal to a design predetermined value, the tension transfer latch plate separates from the lap belt latch plate and pulls the lap belt webbing. This invention allows the tension transfer latch plate to act as a fixed latch plate until the shoulder belt webbing receives a sufficient tensile force to pull the tension transfer latch plate such that it separates from the lap belt latch plate and tightens the lap belt webbing. It is noted that in another embodiment the shoulder belt webbing can be adapted to become the transferee belt and the lap belt webbing can be adapted to serve as the transferor belt.

A preferred embodiment of a tension transfer latch plate assembly of the present invention comprises a transferee plate and a tension transfer latch plate. Each of the plates preferably has, for example, an injection molded plastic cover or other device to prevent webbing tears and to keep the plates together during normal everyday use. The tension transfer latch plate assembly can also guide, position, and retain the tension transfer latch plate via detents in both the injection molded plastic covers. The transferee belt can be routed so that the tension transfer latch plate pulls from the assembly at a predetermined load when the transferor belt is pulled and/or when the supplemental safety device is deployed.

FIGS. 3, 3a, and 3b are schematic diagrams of a preferred embodiment of the present invention in which a shoulder belt is the transferor belt. Lap belt webbing 330 loops through lap belt latch plate assembly 340 and tension transfer latch plate assembly 360. Tension transfer latch plate assembly 360 is attached to lap belt latch plate assembly 340. Lap belt latch plate assembly 340 has tongue 344 that is adapted to engage with buckle 350. Shoulder belt latch plate 320 is adapted to engage with tension transfer latch plate assembly 360 by one of several known quick-release mechanisms. Preferably, the quick-release mechanism comprises snap slot 322 (the female member) and snap stud 362 (the male member). The slot or the stud may be part of shoulder belt latch plate 320 or the transfer latch plate assembly 360, respectively (as shown) or vice-versa.

When shoulder belt webbing 310 attached to shoulder belt latch plate 320 experiences a tensile force that is equal to or greater than the design value, the tensile force pulls shoulder belt latch plate 320. Since shoulder belt latch plate 320 is engaged to tension transfer latch plate assembly 360 via the quick release mechanism, the tensile force is transferred from shoulder belt latch plate 320 to the tension transfer latch plate assembly 360. Since tension transfer latch plate assembly 360 is attached to lap belt webbing 330 via slot 447 in lap belt latch plate assembly 340, as tension transfer latch plate assembly 360 moves away from lap belt latch plate assembly 340, it pulls lap belt webbing 330 through slot 447 in lap belt latch plate assembly 340. Since lap belt latch plate assembly 360 is anchored to buckle 350, tension is developed in lap belt webbing 330 and the occupant is held firmly in the seat.

BRIEF DESCRIPTION OF THE DRAWINGS

FIG. 3b is an exploded, schematic view of a portion of the components shown in FIG. 3a.

FIG. 4 (which comprises FIGS. 4a, 4aa, 4b, 4bb, and 4c) is a schematic diagram showing several views of lap belt latch plate assembly 340, which is a preferred embodiment of the present invention.

FIG. 6 (which comprises FIGS. 6a and 6b) is an exploded, schematic view of lap belt latch plate assembly 340 and tension transfer latch plate assembly 360.

FIG. 10 (which comprises FIGS. 10a, 10aa, 10b, 10bb, and 10c) is a schematic diagram showing several views of lap belt latch plate assembly 340, similar to that shown in FIG. 4, but with an alternative detent/retaining design 1045.

FIG. 13 (which comprises FIGS. 13a and 13b) is a cross-section, schematic view of components of another preferred embodiment that does not use a quick release mechanism, i.e., transferor belt 1310 is not independent (detachable) of transferee belt 1330.

FIGS. 14 through 24 represent isometric views illustrating one way of feeding lap belt webbing 330 through lap belt latch plate assembly 340 and tension transfer latch plate assembly 360.

FIG. 25 (which comprises FIGS. 25a and 25b) shows isometric views of webbing 330 illustrating one way of securing lap belt to tension transfer latch plate assembly 360 by fasteners 2510.

FIG. 26 (which comprises FIGS. 26a and 26b) shows isometric views of the components shown in FIG. 25, illustrating how tension transfer latch plate assembly 360 separates from lap belt latch plate assembly 340.

DETAILED DESCRIPTION OF PREFERRED EMBODIMENTS

Figure 1:
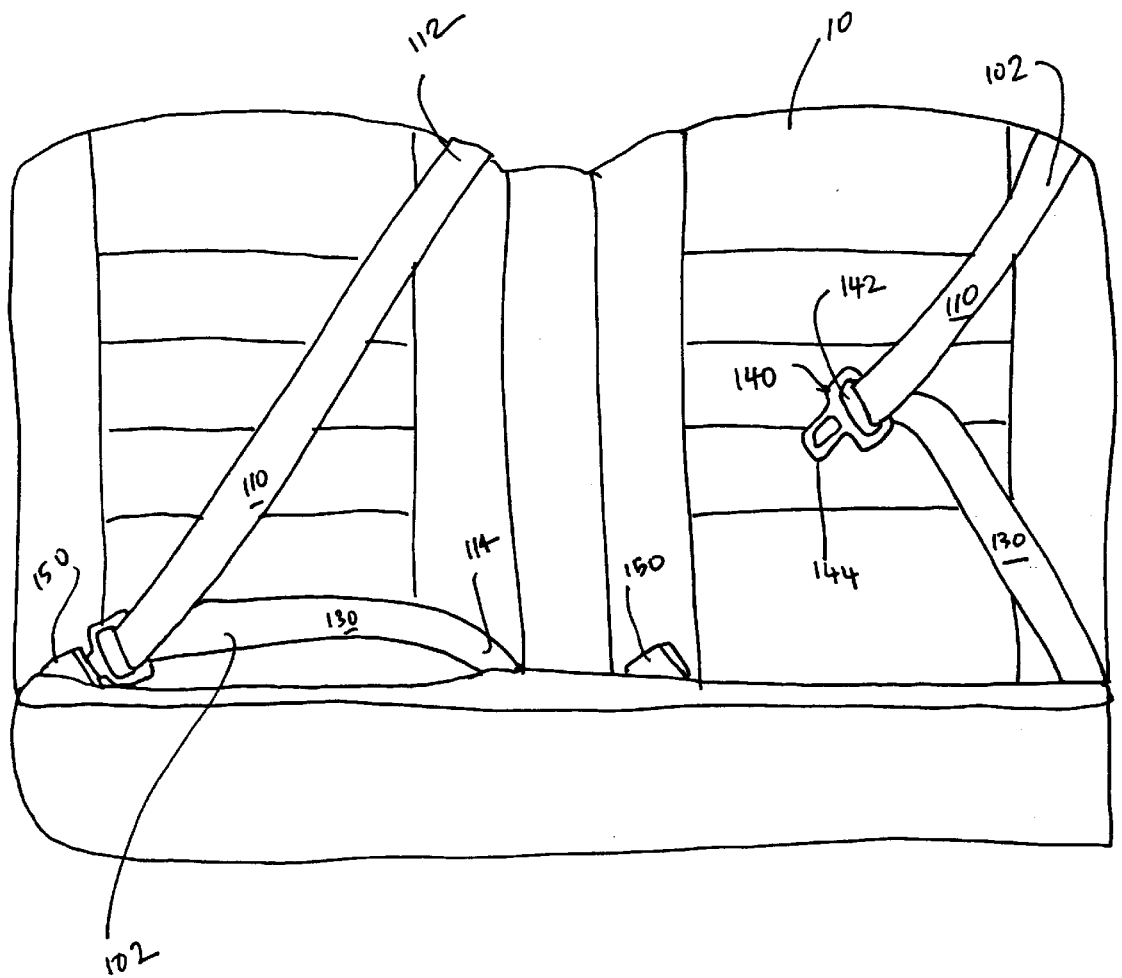
FIG. 1 is a schematic diagram showing a prior-art seat belt system for use in automobiles, with a sliding latch plate.
Figure 2:
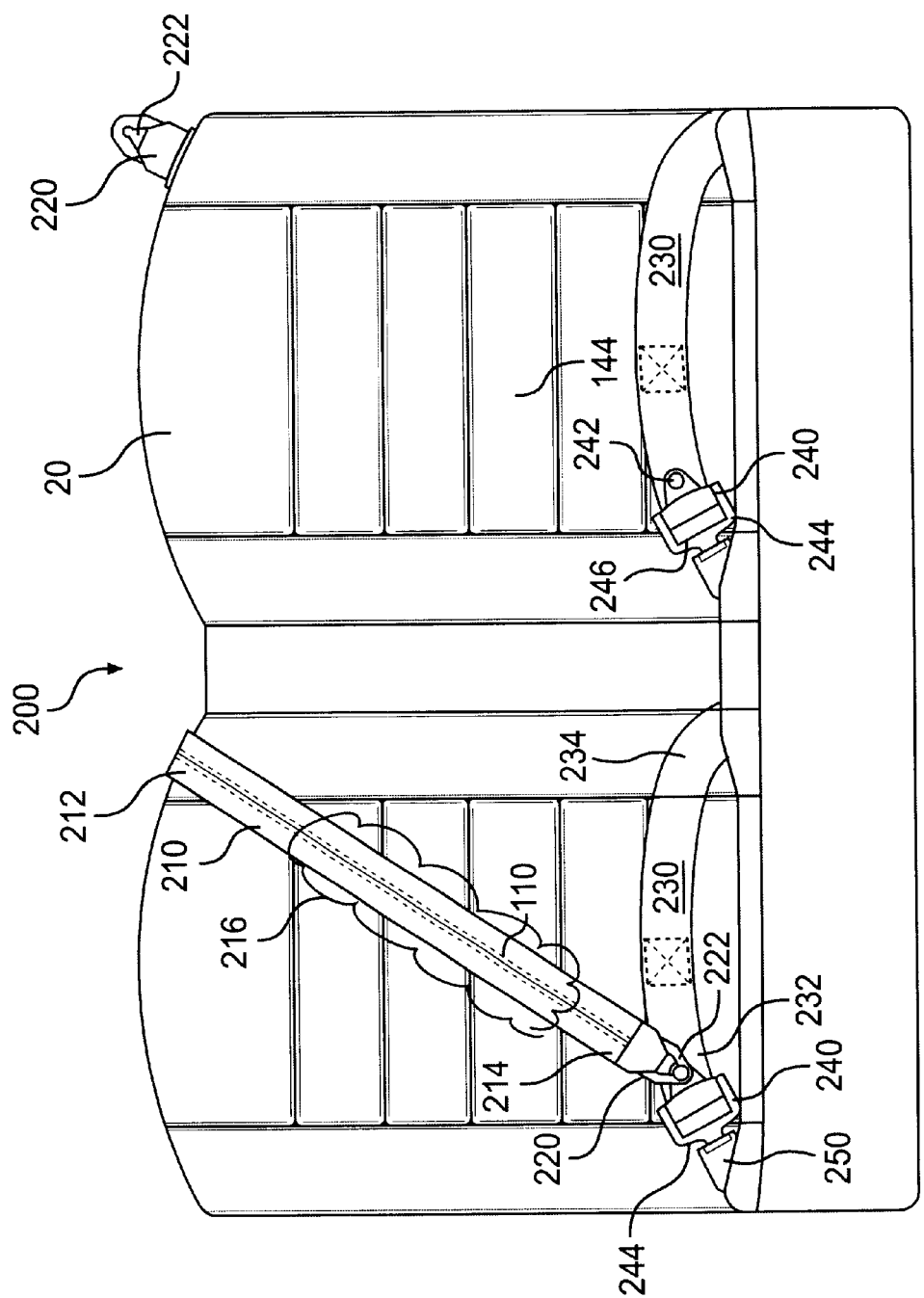
FIG. 2 is a schematic diagram showing a prior-art seat belt system for use in airplanes, with shoulder and lap belts that can be worn independently of each other.
Figure 3:
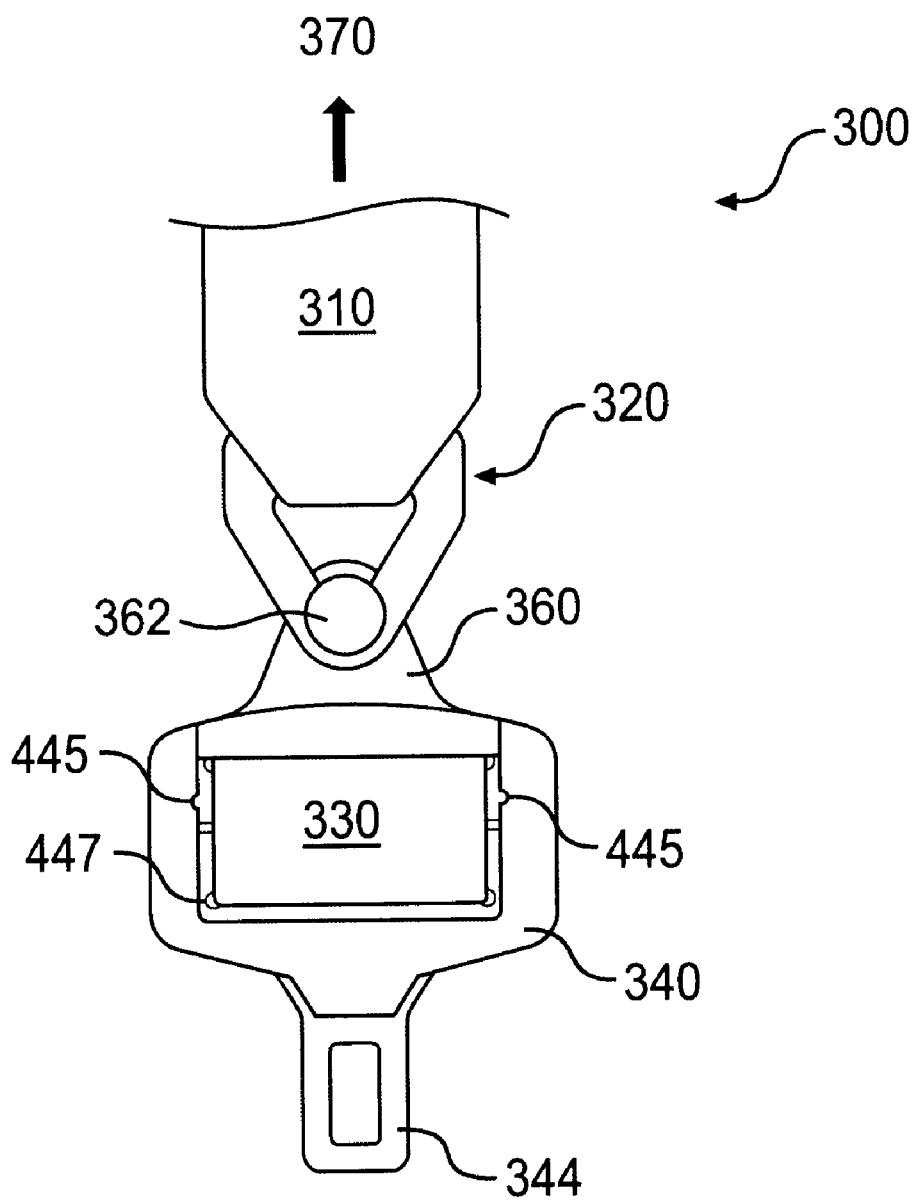
FIG. 3 is a schematic diagram showing a preferred embodiment of the present invention.
Figure 3A:
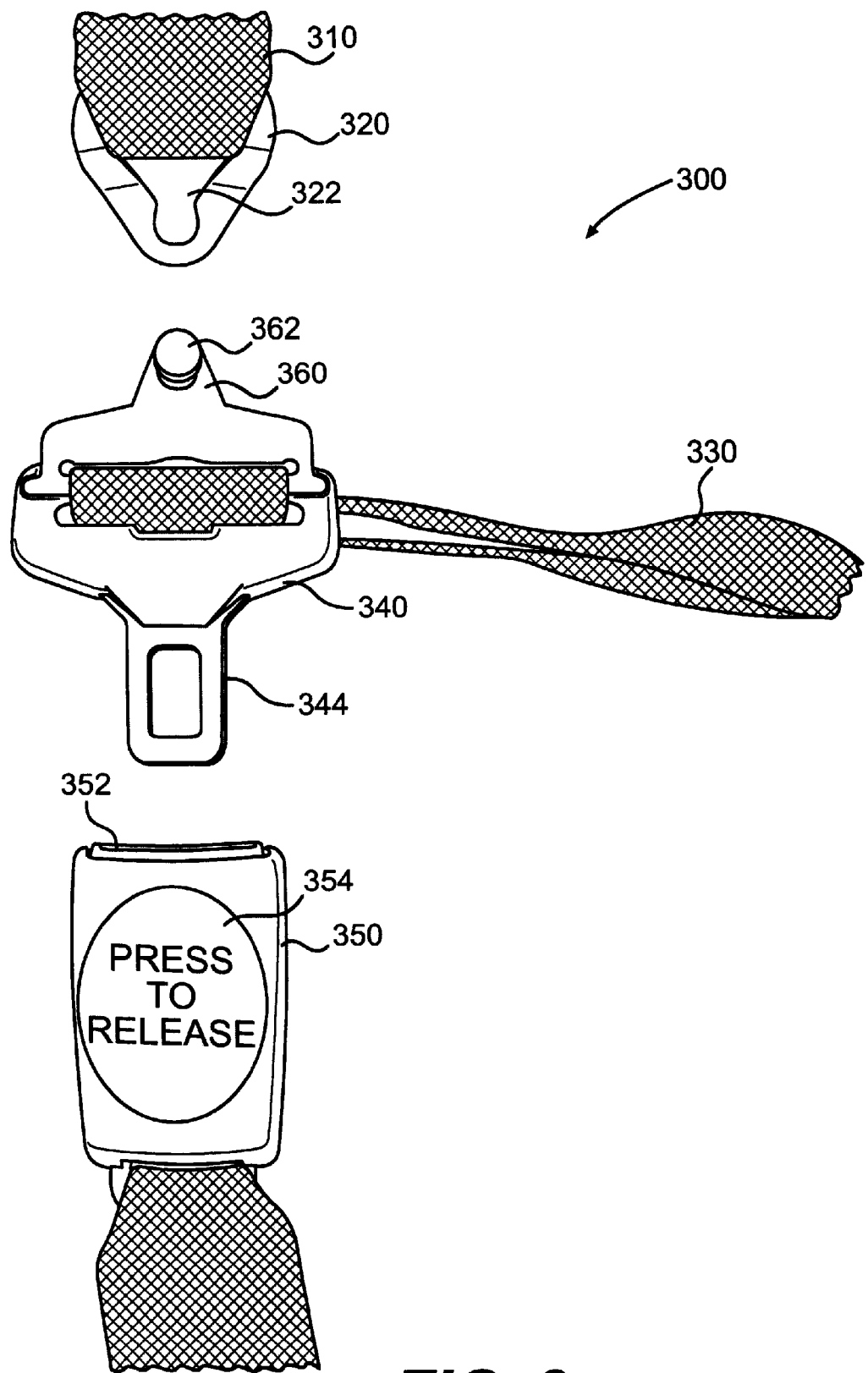
FIG. 3a is a schematic diagram of components of the preferred embodiment shown in FIG. 3.
Figure 3B:
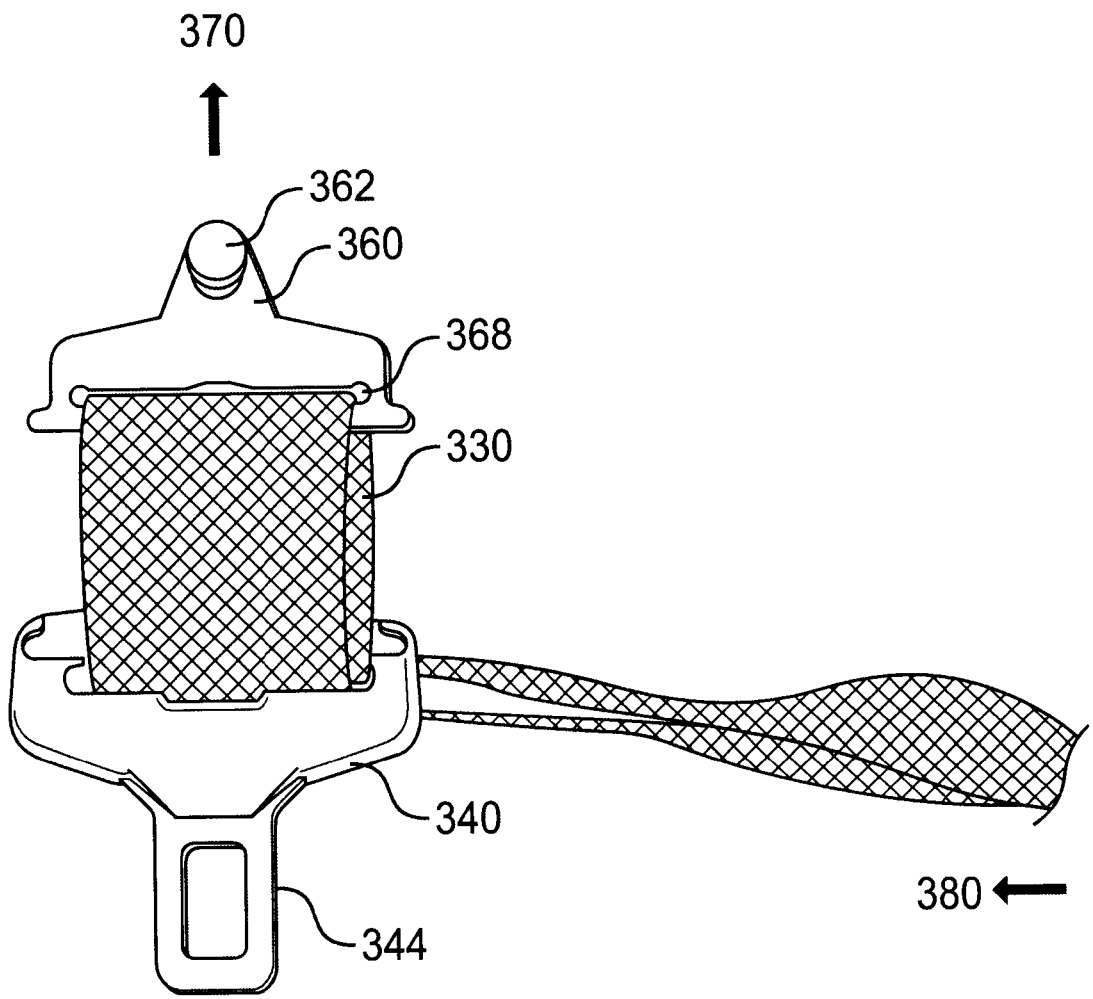

FIGS. 3, 3a, and 3b are schematic diagrams showing a preferred embodiment of a vehicle safety restraint system of the present invention. FIGS. 3, 3a and 3b show shoulder belt webbing 310, shoulder belt latch plate 320, lap belt webbing 330, lap belt latch plate assembly 340, buckle 350, and tension transfer latch plate assembly 360. Shoulder belt webbing 310, shoulder belt latch plate 320, lap belt webbing 330, and buckle 350 of system 300 are similar to corresponding shoulder belt webbing 210, shoulder belt latch plate 220, lap belt webbing 230, and buckle 250 of system 200 shown in FIG. 2. In this embodiment, shoulder belt webbing 310 serves as the transferor belt, and lap belt webbing 330 serves as the transferee belt.

Under normal use conditions (i.e., when an accident is not taking place), a large portion of tension transfer latch plate assembly 360 is encased or housed within (or otherwise united with) lap belt latch plate assembly 340, as shown in FIGS. 3 and 3a. When a sufficient amount of tensile force equal to or greater than a design force or design load is exerted on shoulder belt webbing 310 in direction 370, tension transfer latch plate assembly 360 separates from lap belt latch plate assembly 340, as shown in FIG. 3b, resulting in the force being transferred to lap belt webbing 330. The design force may be, for example, 50 pounds or more.

Tension transfer latch plate assembly 360 comprises stud 362. Stud 362 is adapted to fit in slot 322 of shoulder belt latch plate 320. Stud 362 and slot 322 secure shoulder belt webbing 310 to buckle 350 via tension transfer latch plate assembly 360 and lap belt latch plate assembly 340.

In lieu of stud 362 and slot 322, another quick-release mechanism may be used. Any alternative quick-release mechanism used preferably has a male member (first unit) and a female member (second unit). Each of the male and female members is attached to one of shoulder belt latch plate 320 and tension transfer latch plate assembly 360. Quick-release mechanisms commonly found on car seats, backpacks, etc. may be adapted for use in the invention.

Tension transfer latch plate assembly 360 further comprises slot 368 (shown in FIG. 3b). Lap belt webbing 330 extends through slot 447 (See FIG. 3) of lap belt latch plate assembly 340 and wraps around tension transfer latch plate assembly 360 via slot 368.

When a tensile force greater than or equal to the design force is experienced by shoulder belt webbing 310, tension transfer latch plate assembly 360 is pulled out of lap belt latch plate assembly 340 by the tensile force in direction 370 as shown in FIG. 3b. Because tension transfer latch plate assembly 360 is pulled out of lap belt latch plate assembly 340, and lap belt webbing 330 loops around tension transfer latch plate assembly 360 via slot 368, lap belt webbing 330 also experiences the design force, but in direction 380. In this manner, a tension created in shoulder belt webbing 310 is effectively transferred to lap belt webbing 330.

FIG. 4 (which comprises FIGS. 4a, 4aa, 4b, 4bb, and 4c) is a schematic diagram showing several views of lap belt latch plate assembly 340, which is a preferred embodiment of the present invention. Lap belt latch plate assembly 340 comprises lap belt latch plate 442 and cover 441. FIG. 4a and FIG. 4aa are schematic diagrams showing the front and top views, respectively, of lap belt latch plate 442. FIGS. 4b and 4bb are schematic diagrams showing the front and top views, respectively, of cover 441. FIG. 4b also shows tongue 344 of lap belt latch plate 442 exposed. FIG. 4c is a schematic diagram showing the cross-sectional view of lap belt latch plate assembly 340.

As shown in FIG. 4a, lap belt latch plate 442 comprises slot 446 and tongue 344. Slot 446 is made large enough to accommodate two layers of lap belt webbing 330. Tongue 344 is adapted to fit into a slot of a buckle, such as slot 352 of buckle 350 shown in FIG. 3a. Lap belt latch plate 442 can be stamped from high strength steel. Lap belt latch plate 442 can also be chrome plated.

As shown in FIG. 4b, cover 441 is molded around lap belt latch plate 442 to create lap belt latch plate assembly 340. The molding can be done using any of several known methods, e.g., using an injection molding machine. Note that tongue 344 of latch plate 442 is exposed, i.e., tongue 344 is not surrounded by cover 441, as shown in FIG. 4b. Cover 441 has slots 443 (shown in FIG. 4bb) for receiving tension transfer latch plate 360.

Figure 5:
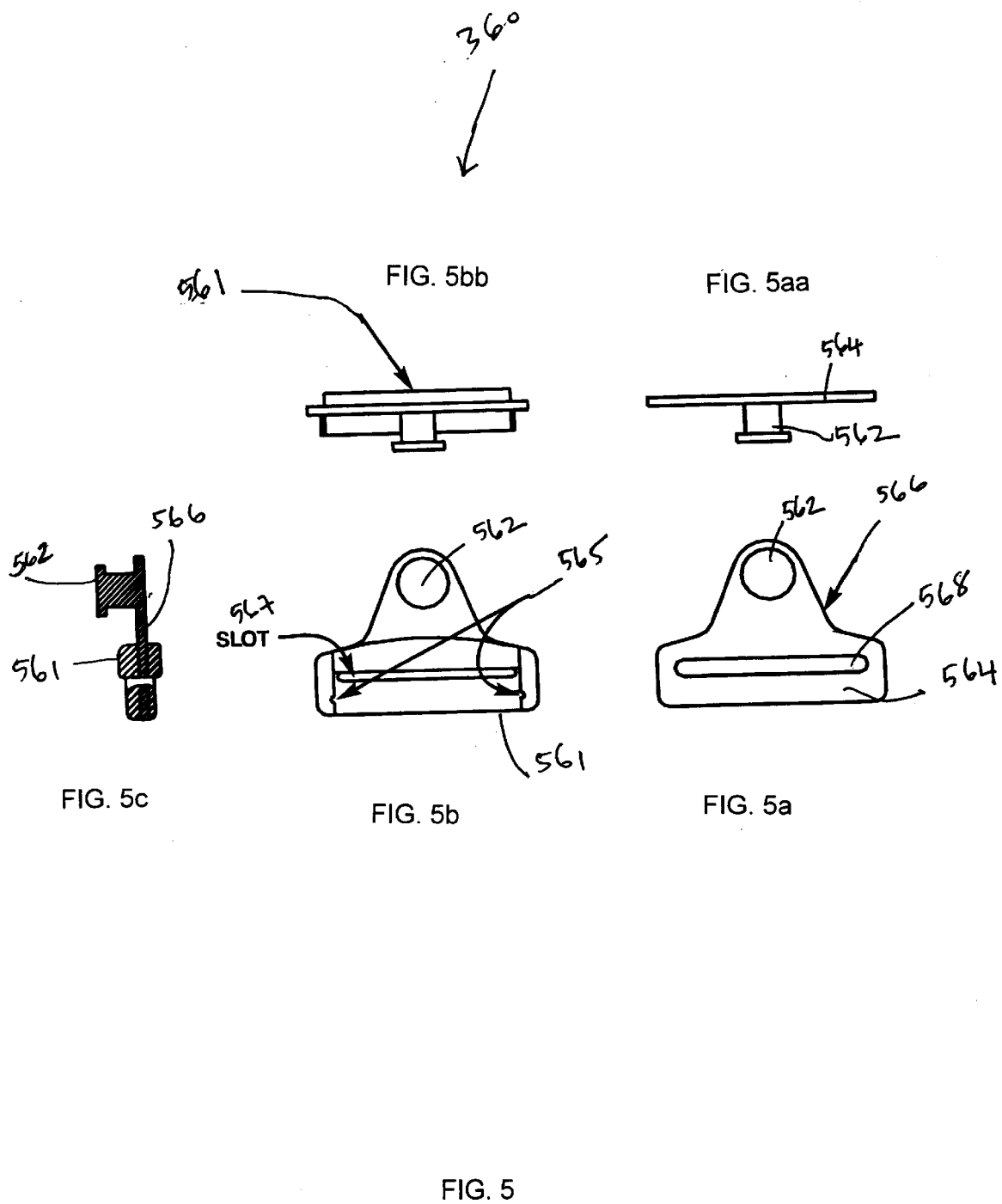
FIG. 5 (which comprises FIGS. 5a, 5aa, 5b, 5bb, and 5c) is a schematic diagram showing several views of tension transfer latch plate assembly 360, which is used in a preferred embodiment of the present invention.

Cover 441 further comprises female detents 445. Female detents 445 are adapted to receive male detents 565 (shown in FIG. 5b of tension transfer latch plate assembly 360). Other components of tension transfer latch plate assembly 360 are shown in FIG. 5 and discussed below. In addition, cover 441 has slot 447 that corresponds to slot 446 of lap belt latch plate 442. Slot 447 of cover 441 can accommodate two layers of lap belt webbing 330.

FIG. 5 (which comprises FIGS. 5a, 5aa, 5b, 5bb, and 5c) is a schematic diagram showing several views of tension transfer latch plate assembly 360, which is a preferred embodiment of the present invention. Tension transfer latch plate assembly 360 comprises tension transfer latch plate 566 and cover 561. FIG. 5a and FIG. 5aa are schematic diagrams showing the front and top views, respectively, of tension transfer latch plate 566. FIGS. 5b and 5bb are schematic diagrams showing the front and top views, respectively, of cover 561. FIG. 5c is a schematic diagram showing the cross-sectional view of tension transfer latch plate assembly 360.

Tension transfer latch plate 566 can be made the same way as lap belt latch plate 442. Similarly, cover 561 can be made the same way as cover 441. One end of lap belt webbing 330 (shown in FIG. 3) can be fed through slots 446 and 447 of lap belt latch plate assembly 340 and slots 567 and 568 of tension transfer latch plate assembly 360, and then back through slots 446 and 447 in tension transfer latch plate assembly 360 (See FIGS. 14–20). Lap belt webbing 330 can be sewn to itself as shown in FIG. 21.

FIG. 6 (which comprises FIGS. 6a and 6b) illustrates how the tension transfer latch plate assembly 360 snaps in and out of lap belt latch plate assembly 340. FIGS. 6a and 6b represent a front view and a section view, respectively.

Figure 7A:
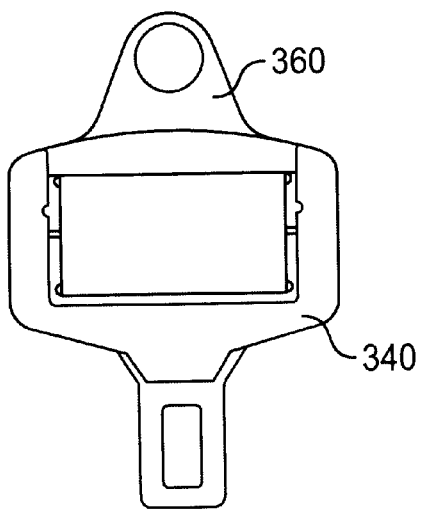
FIG. 7 (which comprises FIGS. 7a, 7aa, and 7b) is a schematic diagram showing several views of lap belt latch plate assembly 340, tension transfer latch plate assembly 360, and lap belt webbing 330.
Figure 7B:
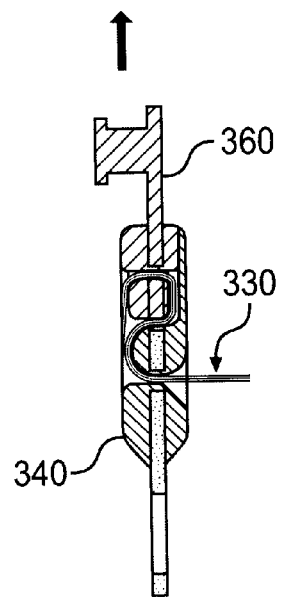
Figure 7A:
Figure 8:
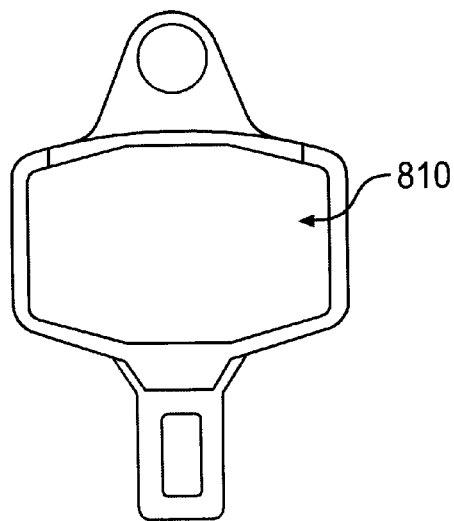
FIG. 8 is a schematic diagram of an embodiment of the present invention that includes cover 810.

FIG. 7 (which comprises FIGS. 7a, 7aa, and 7b) shows lap belt webbing 330 routed through the assembled latch plate assemblies 340 and 360. FIGS. 7a and 7b represent a front view and a section view, respectively. FIG. 8 shows cover 810 that hides webbing 330. Cover 810 could be any cover that protects webbing 330. Cover 810 is preferably color-matched with the vehicle interior.

Figures 9, 9A, 9B:
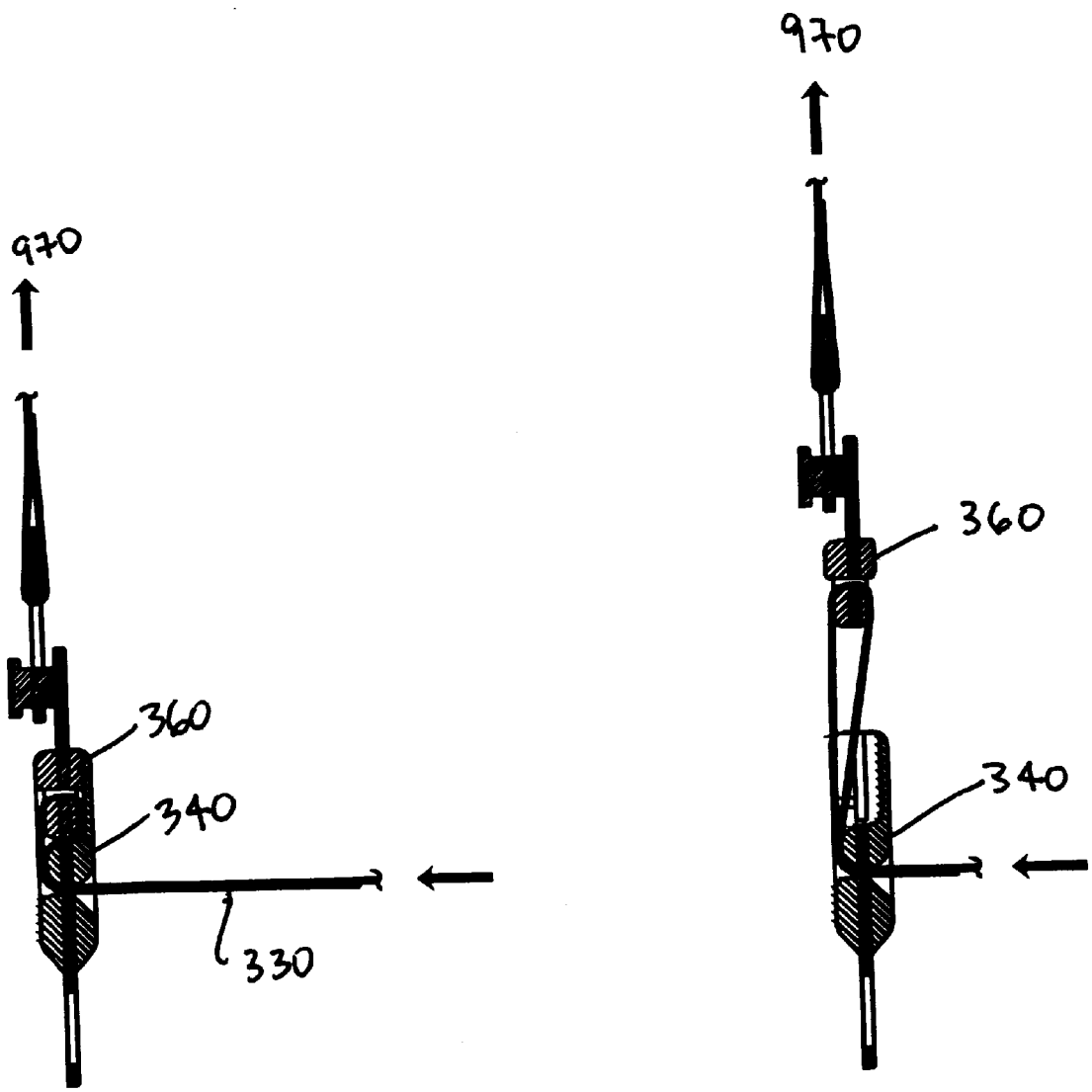
FIG. 9 (which comprises FIGS. 9a and 9b) is a cross-section, schematic view showing tension transfer latch plate 360 attached (FIG. 9a) and then detached (FIG. 9b) to lap belt latch plate assembly 340.
Figure 11C:
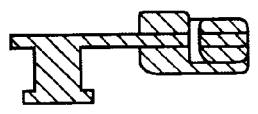
FIG. 11 (which comprises FIGS. 11a, 11aa, 11b, 11bb, and 11c) is a schematic diagram showing several views of tension transfer latch plate assembly 360, similar to that shown in FIG. 5, but with an alternative detents/retaining design 1165.
Figure 11B:
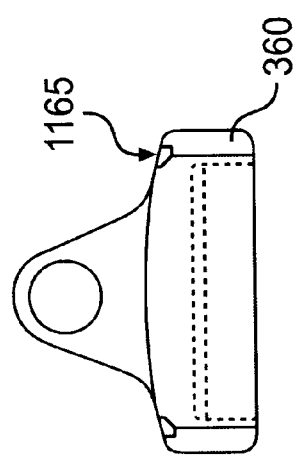
Figure 11B:
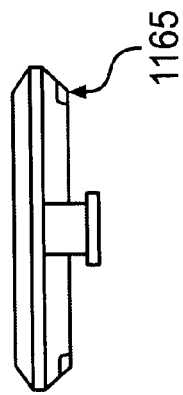
Figure 11A:
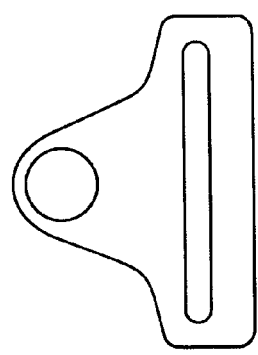
Figure 11A:
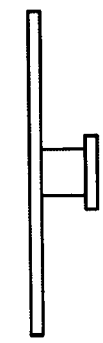

FIG. 9a is a cross-section, schematic view showing tension transfer latch plate assembly 360 united with lap belt latch plate assembly 340 during normal use conditions, i.e., tensile force 970 is less than the design value.

FIG. 9b is a cross-section, schematic view showing tension transfer latch plate assembly 360 separated from lap belt latch plate assembly 340 when tensile force 970 exceeds the design value.

FIG. 10 (which comprisings FIGS. 10a, 10aa, 10b, 10bb, and 10c) shows an alternative detent arrangement and chamfered "guides" for the lap belt latch plate assembly 340, similar to that shown in FIG. 4, but with an alternative detent/retaining design 1045.

FIG. 11 (which comprises FIGS. 11a, 11aa, 11b, 11bb, and 11c) shows a corresponding tension transfer latch plate assembly 360 for the lap belt latch plate assembly shown in FIG. 10.

Figure 12:
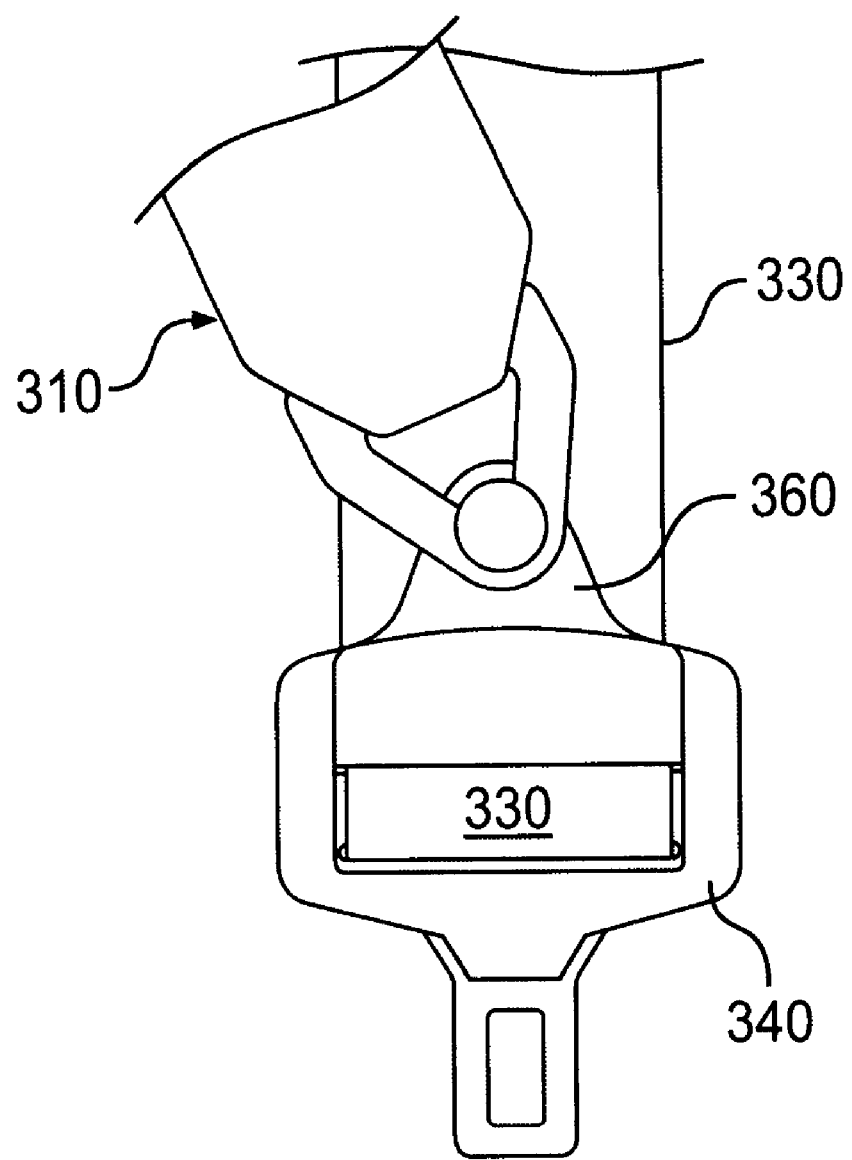
FIG. 12 is a schematic diagram showing components of another preferred embodiment of the present invention, which is generally similar to that shown in FIG. 3, but with an alternative detents/retaining design.

FIG. 12 shows an alternate arrangement of the tension transfer latch plate 360 and lap belt latch plate assembly 340, the alternate arrangement being in the detents/retaining design.

FIG. 13 (which comprises FIGS. 13a and 13b) is a cross-section, schematic view of an alternative embodiment in which a quick release mechanism is not used. In the embodiment shown in FIG. 13, transferor belt 1310 cannot be worn independently of transferee belt 1330. FIG. 13a shows the configuration during normal use conditions. FIG. 13b shows how a tensile force exerted on transferor belt 1310 is transferred to transferee belt 1330.

In an embodiment in which a supplemental safety device 1316, e.g., an ITTR, is located in the lap belt (transferor belt 1310) instead of the shoulder belt, the invention can be used to pull webbing from the shoulder belt (transferee belt 1330) through tension transfer latch plate assembly 1360 when supplemental safety device 1316 in the lap belt is deployed. This would provide pre-tensioning of both the shoulder belt and the lap belt. FIGS. 13a and 13b show the operation of the tensioning device.

As it would be apparent to one ordinarily skilled in the art, the various plates of the present invention could be stamped, laser cut, machined or punched, etc. Each of the covers could be made in two or more pieces and attached via chemical or mechanical bonding, or by welding, bolting or snapping the parts together. The detents could be incorporated in the plates so that no injection molding would be required.

Tension transfer latch plate assembly 360 could be made in different shapes depending on the mating buckle. Also, one or more of the latch plates can be bent to match the occupant's contour.

FIGS. 14 through 23 represent isometric views of a preferred embodiment of the present invention, illustrating one way of feeding lap belt webbing 330 through lap belt latch plate assembly 340 and tension transfer latch plate assembly 360.

Figure 14B:
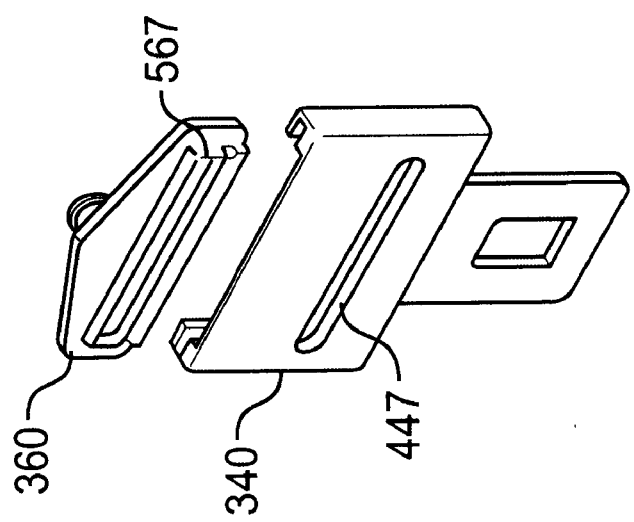
Figure 14A:
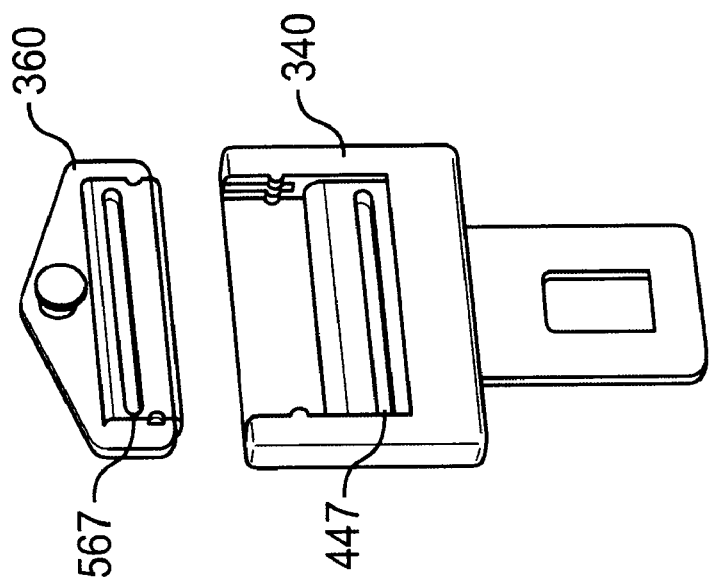

FIG. 14 (which comprises FIGS. 14a and 14b) shows isometric views of lap belt latch plate assembly 340 and tension transfer latch plate assembly 360. In FIG. 14, lap belt latch plate assembly 340 and tension transfer latch plate assembly 360 are shown without lap belt webbing 330.

FIG. 15 (which comprises FIGS. 15a and 15b) shows isometric views of lap belt latch plate assembly 340 and tension transfer latch plate assembly 360. In FIG. 15, lap belt webbing 330 is shown to feed through slot 447 of lap belt latch plate assembly 340.

FIG. 16 (which comprises FIGS. 16a and 16b) shows isometric views of lap belt latch plate assembly 340 and tension transfer latch plate assembly 360. In FIG. 16, one end of lap belt webbing 330 is shown to bend upward toward tension transfer latch plate assembly 360. It is noted that lap belt webbing 330 can be attached to tension transfer latch plate assembly 360 by one or more clamps, rivets, screws, or another fastener. In such arrangement, lap belt webbing 330 does not have to go back through lap belt latch plate 340 and be sewn onto itself.

FIG. 17 (which comprises FIGS. 17a and 17b) shows isometric views of lap belt latch plate assembly 340 and tension transfer latch plate assembly 360. In FIG. 17, one end of lap belt webbing 330 is shown to feed through slot 567 of tension transfer latch plate assembly 360.

FIG. 18 (which comprises FIGS. 18a and 18b) shows isometric views of lap belt latch plate assembly 340 and tension transfer latch plate assembly 360. In FIG. 18, one end of lap belt webbing 330, after feeding through slot 567 of tension transfer latch plate assembly 360, is shown to bend downward and inward between tension transfer latch plate assembly 360 and lap belt latch plate assembly 340.

FIG. 19 (which comprises FIGS. 19a and 19b) shows isometric views of lap belt latch plate assembly 340 and tension transfer latch plate assembly 360. In FIG. 19, after the configuration shown in FIG. 18, one end of lap belt webbing 330 is shown to bend downward between lap belt latch plate assembly 340 and a portion of lap belt webbing 330 that has been previously fed through slot 447.

FIG. 20 (which comprises FIGS. 20a and 20b) shows isometric views of lap belt latch plate assembly 340 and tension transfer latch plate assembly 360. In FIG. 20, after the configuration shown in FIG. 19, one end of lap belt webbing 330 is shown to feed through slot 447, (for the second time) of lap belt latch plate assembly 340, and secured with the portion of lap belt webbing 330 that was previously fed through slot 447. Preferably, lap belt webbing 330 is attached onto itself at location 2010. Preferably lap belt webbing 330 is sewn to itself at location 2010 although other fastening means can be used.

FIG. 21 (which comprises FIGS. 21a and 21b) shows isometric views of lap belt latch plate assembly 340 united with tension transfer latch plate assembly 360 after lap belt webbing 330 has looped through them and attached.

Figure 22:
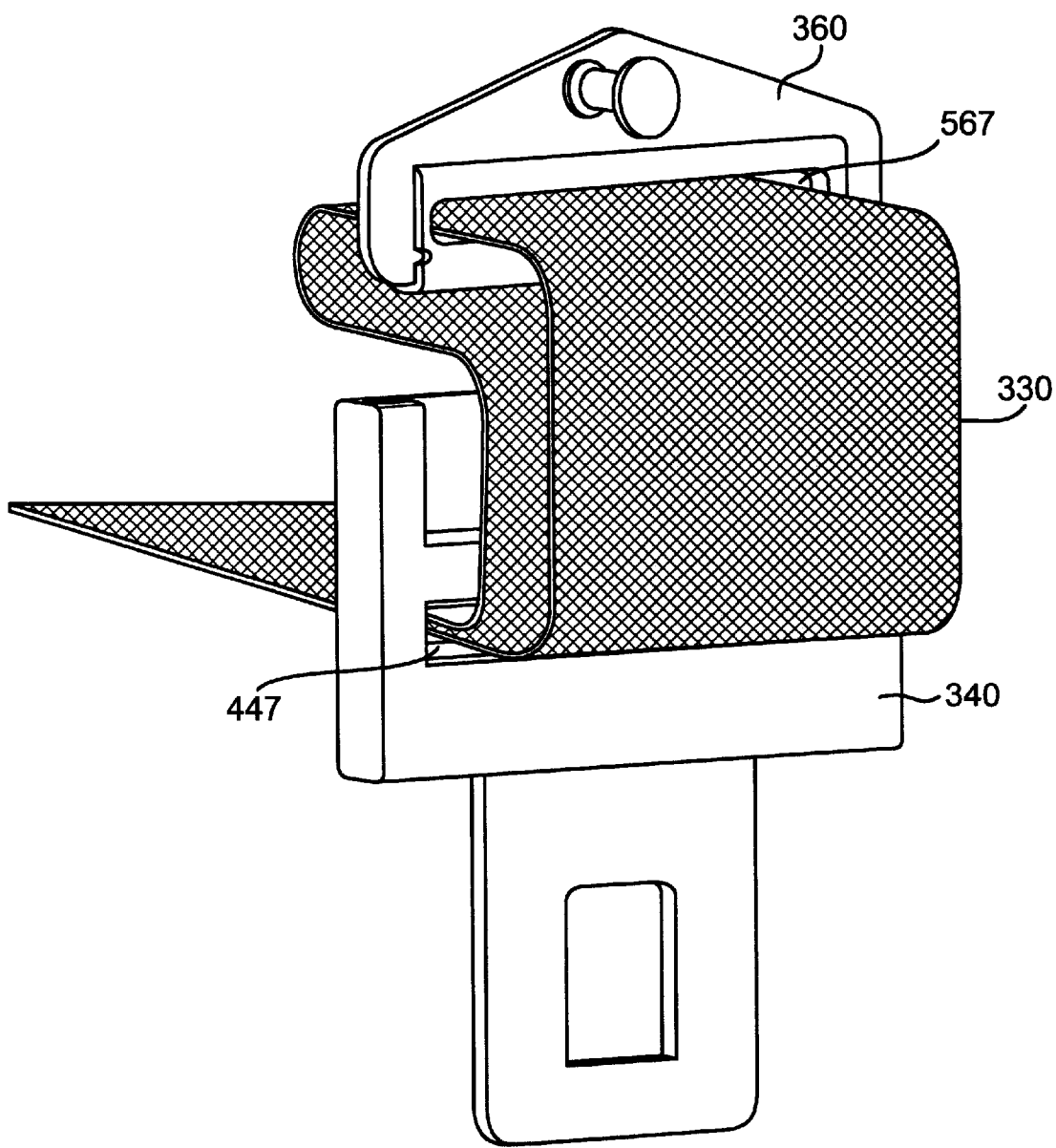

FIG. 22 shows another isometric view of lap belt latch plate assembly 340 and tension transfer latch plate assembly 360 with lap belt webbing 330 looped through them.

Figure 23:
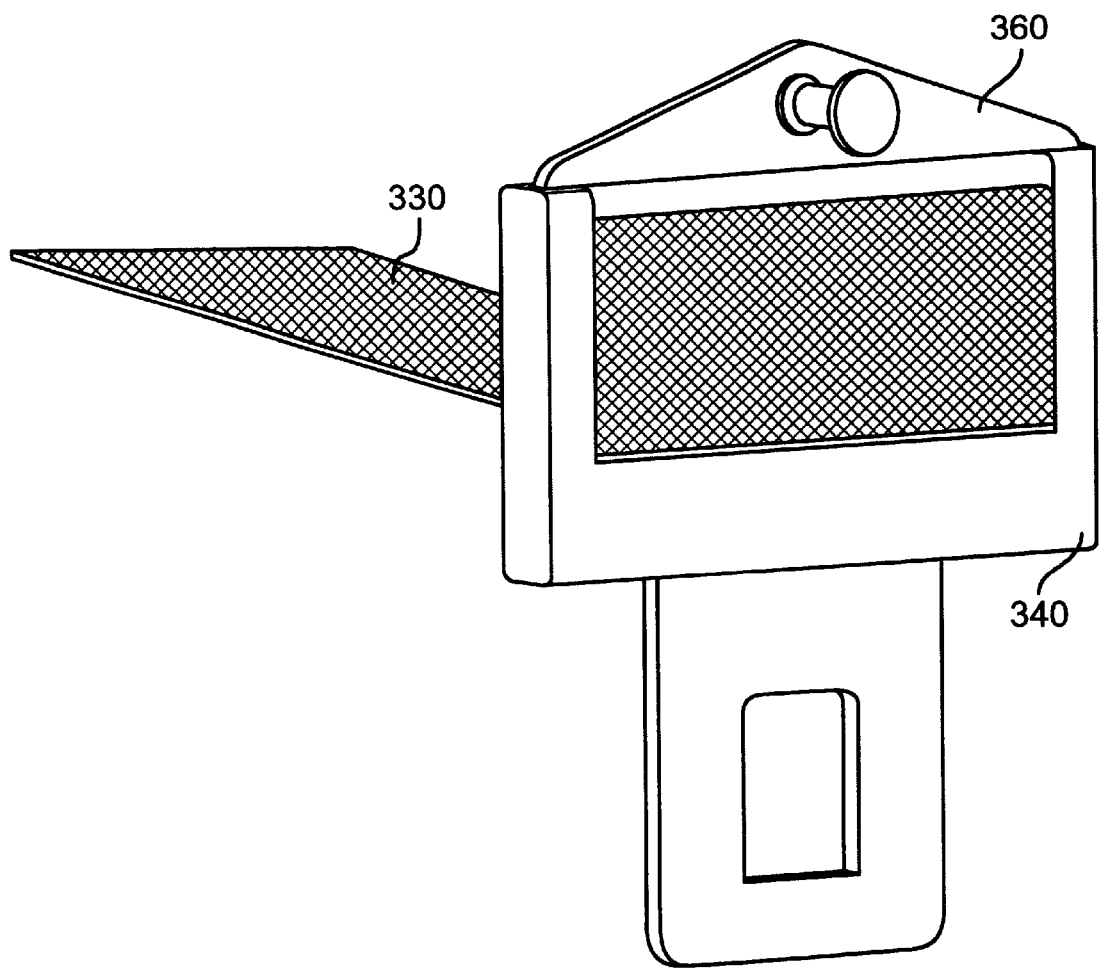

FIG. 23 shows an isometric view of tension transfer latch plate assembly 360 encased or housed within (or otherwise united with) lap belt latch plate assembly 340 with lap belt webbing 330 looped through them.

Figure 24:
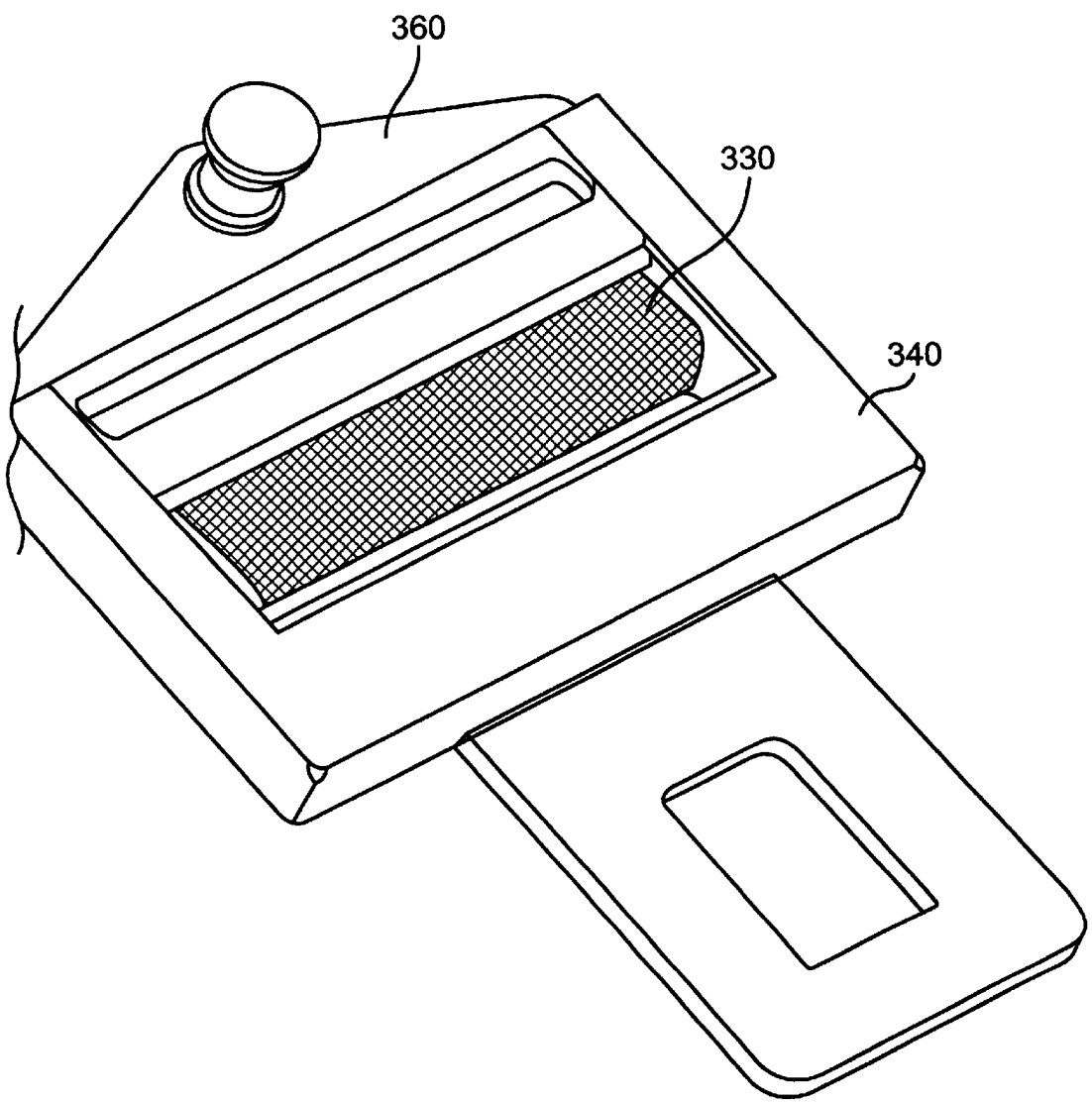

FIG. 24 shows an isometric view of a different embodiment of tension transfer latch plate assembly 360 encased or housed within lap belt latch plate assembly 340 with lap belt webbing 330 looped through them and sewn.

For one continuous webbing, such as in automotive applications, a plastic part having the locking features could be attached to the webbing in the desired location. FIG. 25 (which comprises FIGS. 25a and 25b) shows isometric views of an alternative embodiment of the invention showing tension transfer latch plate assembly 2560 encased or housed within lap belt latch plate assembly 2540 with continuous webbing 2530 looped through them. In this embodiment, continuous webbing 2530 is secured to tension transfer latch plate assembly 2560 by fasteners 2510. Fasteners 2510 can be, for example, rivets. Screws and other suitable fasteners may be used to secure continuous webbing 2530 on tension transfer latch plate assembly 2560.

FIG. 26 (which comprises FIGS. 26a and 26b) shows isometric views of how tension transfer latch plate assembly 2560 separates from tension transfer latch plate assembly 2540 while continuous webbing 2530 is still looped within slot 2547 of lap belt latch plate assembly 2540.

In describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

The foregoing disclosure of the embodiments of the invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. A system for transferring a tensile force from a transferor belt to a transferee belt comprising:
    (a) a transferor plate attached to the transferor belt, wherein the transferor plate has a first unit of a quick release mechanism;
    (b) a tension transfer latch plate attached to the transferee belt, wherein the tension transfer latch plate has a second unit of the quick release mechanism, wherein the second unit of the quick release mechanism is adapted to mate with the first unit of the quick release mechanism; and (c) a transferee plate adapted to slide freely along the transferee belt, wherein the transferee plate is united with the tension transfer latch plate to withstand up to a design tensile force exerted on the transferor belt, wherein when a tensile force that is equal to or greater than the design tensile force is exerted on the transferor belt, the tension transfer latch plate separates from the transferee plate, and the tensile force pulls the transferee belt through the transferee plate.

2. The system of claim 1, wherein the design tensile force is at least 50 pounds.

3. The system of claim 1, wherein one of the units of the quick release mechanism is a stud and the other unit is a slot.

4. The system of claim 1, wherein the transferee belt is sewn onto itself after looping through the tension transfer latch plate.

5. The system of claim 1, wherein the transferee belt is attached on the tension transfer latch plate by a fastener.

6. The system of claim 5, wherein the fastener comprises one or more rivets, clamps, and screws.

7. The system of claim 1, wherein the transferor belt is a shoulder belt and the transferee belt is a lap belt.

8. The system of claim 1, wherein the transferor belt is a lap belt and the transferee belt is a shoulder belt.

9. The system of claim 1, further comprising a supplemental safety device that supplies the tensile force.

10. A vehicle safety restraint system for a vehicle comprising:
    (a) a transferor belt having a first end and a second end, wherein the first end of the transferor belt is attached to the vehicle;
    (b) a transferee belt having a first end and a second end, wherein the first end of the transferee belt is attached to the vehicle;
    (c) means for engaging the second end of the transferor belt and the second end of the transferee belt, and
    (d) a buckle for securing the engaging means to the vehicle,
wherein when a tensile force that is greater than or equal to a design force is exerted on the transferor belt, the engaging means transfers the tensile force to the transferee belt.

11. The system of claim 10, wherein the engaging means comprises a tension transfer plate assembly and a transferee plate assembly.

12. The system of claim 11, wherein the tension transfer plate assembly and the transferee plate assembly are adapted to be united during normal use conditions and be separated by the tensile force.

13. The system of claim 12, wherein one of the tension transfer plate assembly and the transferee plate assembly has a male member and the other assembly has a female member, wherein the male member and the female member unite the assemblies during normal use conditions.

14. The system of claim 13, wherein the tensile force separate the male member from the female member.

15. A vehicle safety restraint system for a vehicle comprising:
    (a) a transferor belt having a first end and a second end, wherein the first end of the transferor belt is attached to the vehicle;
    (b) a transferor plate attached to the second end of the transferor belt, wherein the transferor plate has a first unit of a quick release mechanism;
    (c) a tension transfer latch plate having a second unit of the quick release mechanism, wherein the second unit of the quick release mechanism is adapted to mate with the first unit of the quick release mechanism;
    (d) a transferee belt having a first end and a second end, wherein the first end of the transferee belt is attached to the vehicle, and wherein the second end of the transferee belt is secured onto the tension transfer latch plate;
    (e) a transferee plate adapted to slide freely along the transferee belt, wherein the transferee plate is further adapted to unite with the tension transfer latch plate; and
    (f) a buckle adapted to receive the transferee plate,
wherein when a tensile force greater than or equal to a design force is exerted on the transferor belt, the tensile force separates the tension transfer latch plate from the transferee plate.

16. The system of claim 15, wherein one of the transferor plate and the tension transfer plate includes a snap stud, and the other of the transferor plate and the tension transfer plate includes a snap slot.

17. The system of claim 15, further comprising a supplemental safety device that produces the tensile force.

18. The system of claim 17, wherein the supplemental safety device is adapted to tighten the transferor belt.

19. The system of claim 17, wherein the supplemental safety device comprises an inflatable tubular torso restraint.

20. The system of claim 19, wherein the inflatable tubular torso restraint is adapted to tighten the transferor belt.

21. A method for a transferring a tensile force from a transferor belt having a first end and a second end to a transferee belt having a first end and a second end comprising the steps of:

securing the first end of the transferor belt and the first end of the transferee belt to one side of a vehicle;

attaching the second end of the transferor belt on a transferor plate, wherein the transferor plate has a first unit of a quick release mechanism;

feeding the second end of the transferee belt through a transferee plate and attaching the second end of the transferee belt on a tension transfer latch plate, wherein the tension transfer latch plate has a second unit of the quick release mechanism;

uniting the transferee plate with the tension transfer latch plate to withstand a design force;

engaging the transferee plate in a buckle that is secured on an opposite side of the vehicle; and engaging the first unit and the second unit of the quick release mechanism;

wherein when a tensile force that is at least as strong as the design force is experienced by the transferor belt, the tension transfer plate is separated from the transferee plate, thereby transferring the tensile force to the transferee belt.

22. The method of claim 21, wherein the design tensile force is at least 50 pounds.

23. The method of claim 21, further comprising the step of looping the transferee belt through a slot in the tension transfer latch plate.

24. The method of claim 21, wherein the second end of the transferee belt is sewn onto itself after looping through the tension transfer latch plate.

25. The method of claim 21, wherein the second end of the transferee belt is attached to the tension transfer latch plate using one or more fasteners.

26. A vehicular safety device comprising:
(a) a continuous webbing having a transferor portion and a transferee portion;
(b) a tension transfer plate attached to the continuous webbing at a location between the transferor portion and the transferee portion;
(c) a transferee plate adapted to slide freely along the transferee portion, wherein the transferee plate is adapted to hold the tension transfer plate to withstand a design force; and
(d) a buckle adapted to receive the transferee plate,
wherein when the transferor portion experiences a tensile force that is equal to or greater than the design force, the tension transfer plate is separated from the transferee plate, thereby transferring the tensile force to the transferee portion.

27. A vehicular safety device comprising:
(a) a transferor belt;
(b) a tension transfer plate attached to one end of the transferors belt, wherein the other end of the transferor belt is attached to one side of a vehicle;
(c) a transferee plate adapted to hold the tension transfer plate during normal use conditions;
(d) a transferee belt looping through a slot in the transferee plate, wherein one end of the transferee belt is attached to the transferee plate and the other end of the transferee belt is attached to the one side of the vehicle; and
(e) a buckle adapted to receive the transferee plate, wherein the buckle is attached to an opposite side of the vehicle,
wherein when the transferor belt experiences a tensile force that is greater than that encountered during normal use conditions, the tension transfer plate is separated from the transferee plate.

* * * * *